United States Patent [19]

Perlmutter

[11] Patent Number: 4,602,335
[45] Date of Patent: Jul. 22, 1986

[54] FUEL EFFICIENT CONTROL OF MULTIPLE UNIT LOCOMOTIVE CONSISTS

[75] Inventor: Leonard Perlmutter, Aurora, Colo.

[73] Assignee: K.C. Southern Railway Company, Kansas City, Mo.

[21] Appl. No.: 521,915

[22] Filed: Aug. 10, 1983

[51] Int. Cl.⁴ ............... G05D 13/66; G05D 17/02; B60L 15/38
[52] U.S. Cl. .................... 364/426; 364/442; 105/61
[58] Field of Search ............ 364/424, 426, 442; 105/61

[56] References Cited

U.S. PATENT DOCUMENTS

| | | | |
|---|---|---|---|
| 3,384,032 | 5/1968 | Ruff | 105/61 |
| 3,384,033 | 5/1968 | Ruff | 105/61 |
| 3,698,325 | 10/1977 | Grundy | 105/61 |
| 3,790,778 | 2/1974 | Oster | 105/61 |
| 3,969,654 | 7/1976 | Grundy et al. | 105/61 |
| 4,000,872 | 1/1977 | Grundy | 364/426 |
| 4,042,810 | 8/1977 | Mosher | 364/424 |
| 4,118,774 | 10/1978 | Franke | 364/424 |
| 4,234,922 | 11/1980 | Wilde et al. | 364/426 |
| 4,344,364 | 8/1982 | Nickles et al. | 364/442 X |
| 4,360,873 | 11/1983 | Wilde et al. | 364/426 |
| 4,401,035 | 8/1983 | Spigarelli et al. | 364/426 X |

*Primary Examiner*—Felix D. Gruber
*Attorney, Agent, or Firm*—Kokjer, Kircher, Bradley, Wharton, Bowman & Johnson

[57] ABSTRACT

An electronic fuel conserving control system for multiple unit locomotive consists. The control system varies the throttle settings of the individual locomotive units among full power, half power and minimal power settings to operate the consist in a fuel efficient manner while maintaining the desired speed. Special features include automatic dropping of the locomotive to full power reduction when the air brakes have been applied for 30 seconds, a 90 second manual override period which is initiated when the dynamic brake is released after having been applied for 30 seconds, dip switch selection of the number of units available for dynamic brake loading, a power reduction button for quickly reducing power, minimum and maximum speed limit switches which establish a speed range in which the control system operates the train, and a solid state control circuit for controlling the governor solenoids of the locomotives in the fuel save mode of operation.

24 Claims, 19 Drawing Figures

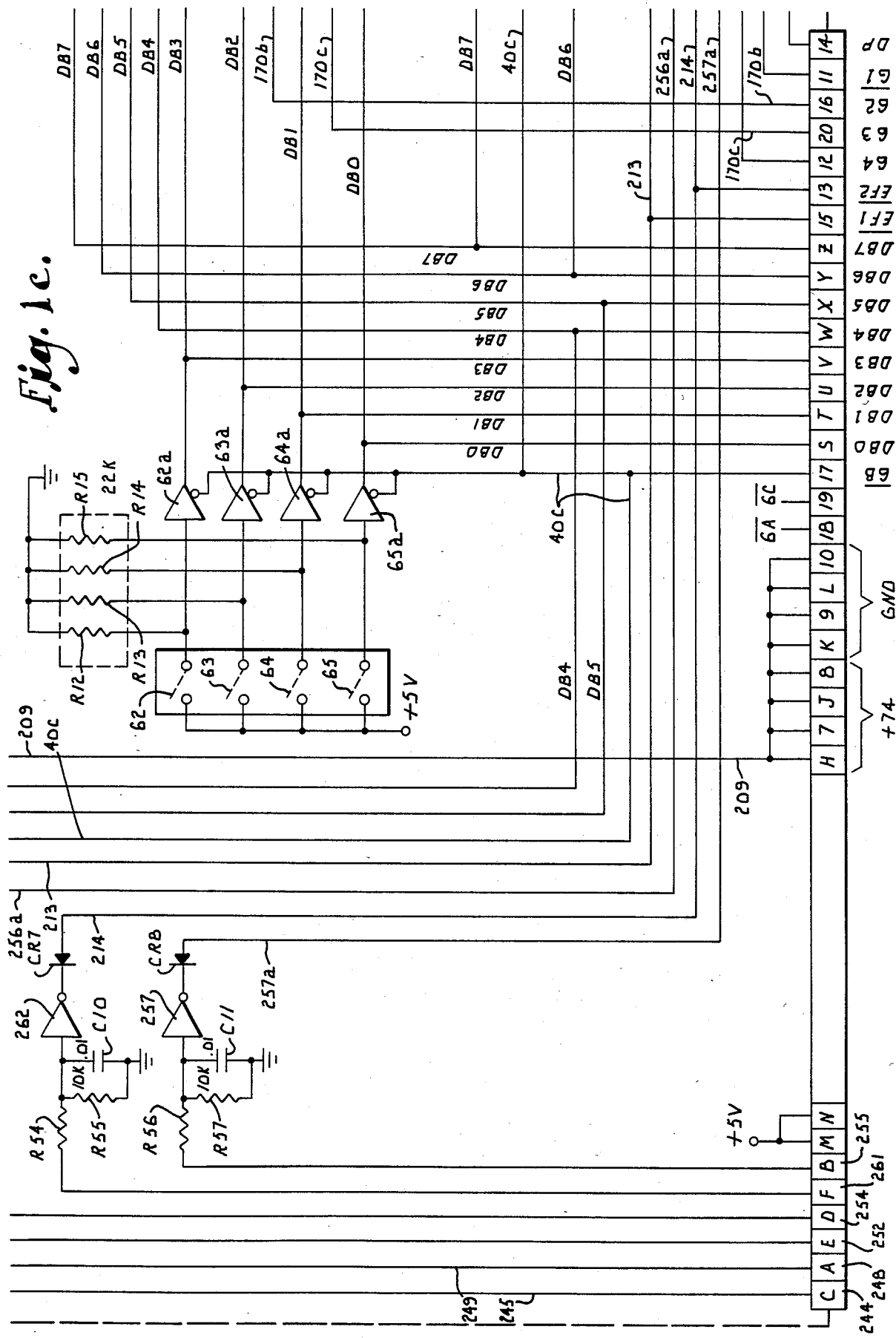

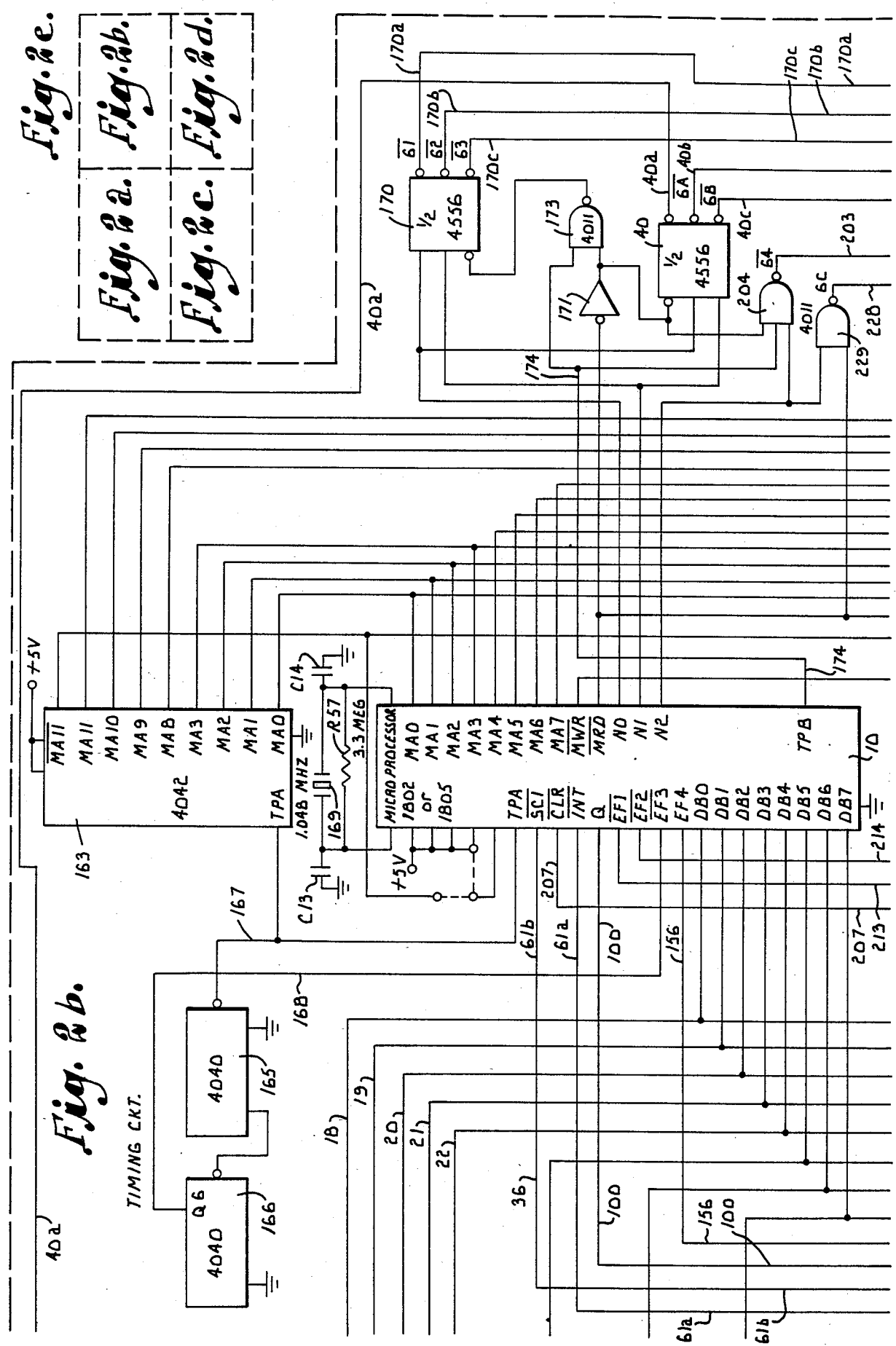

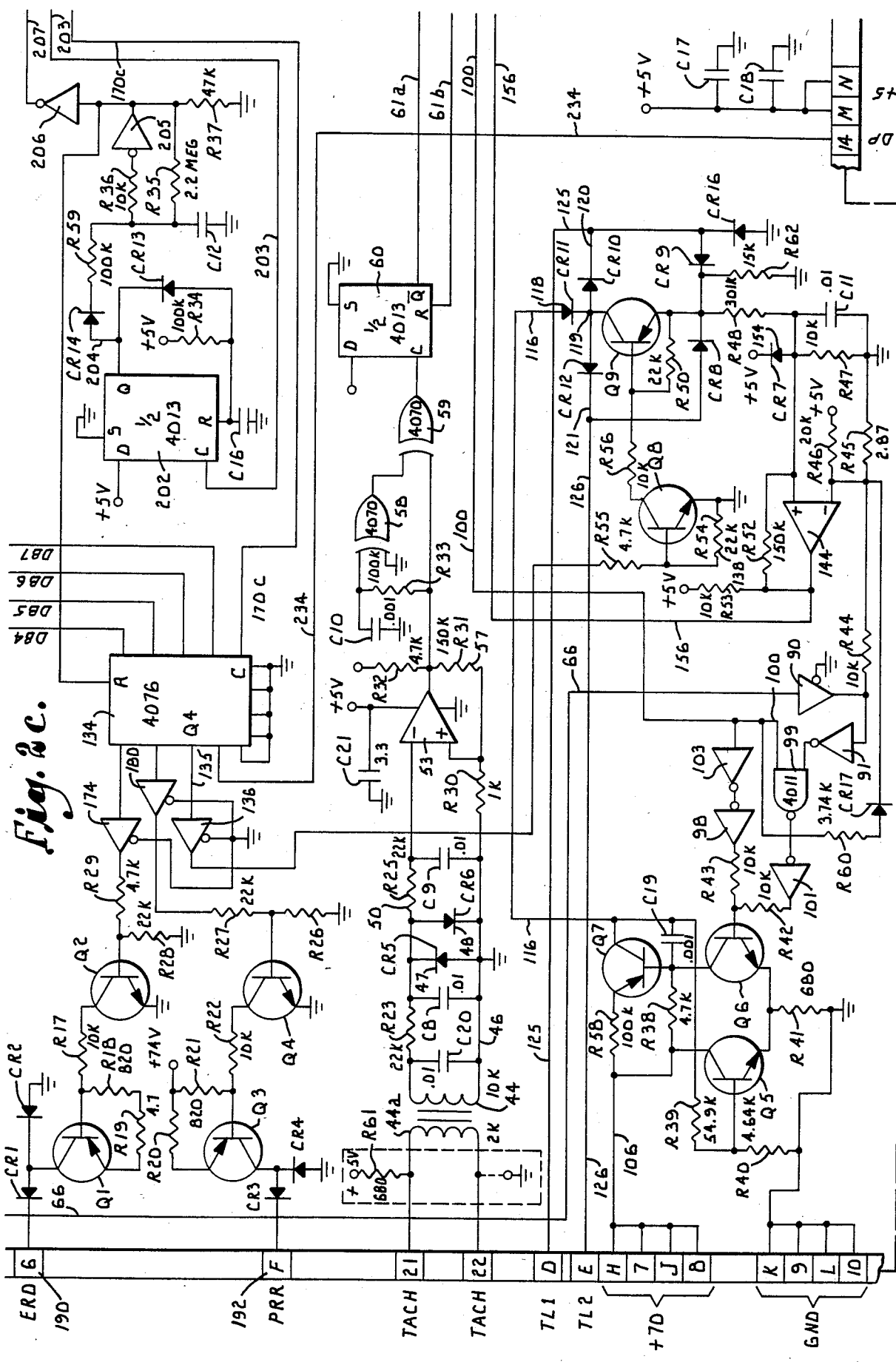

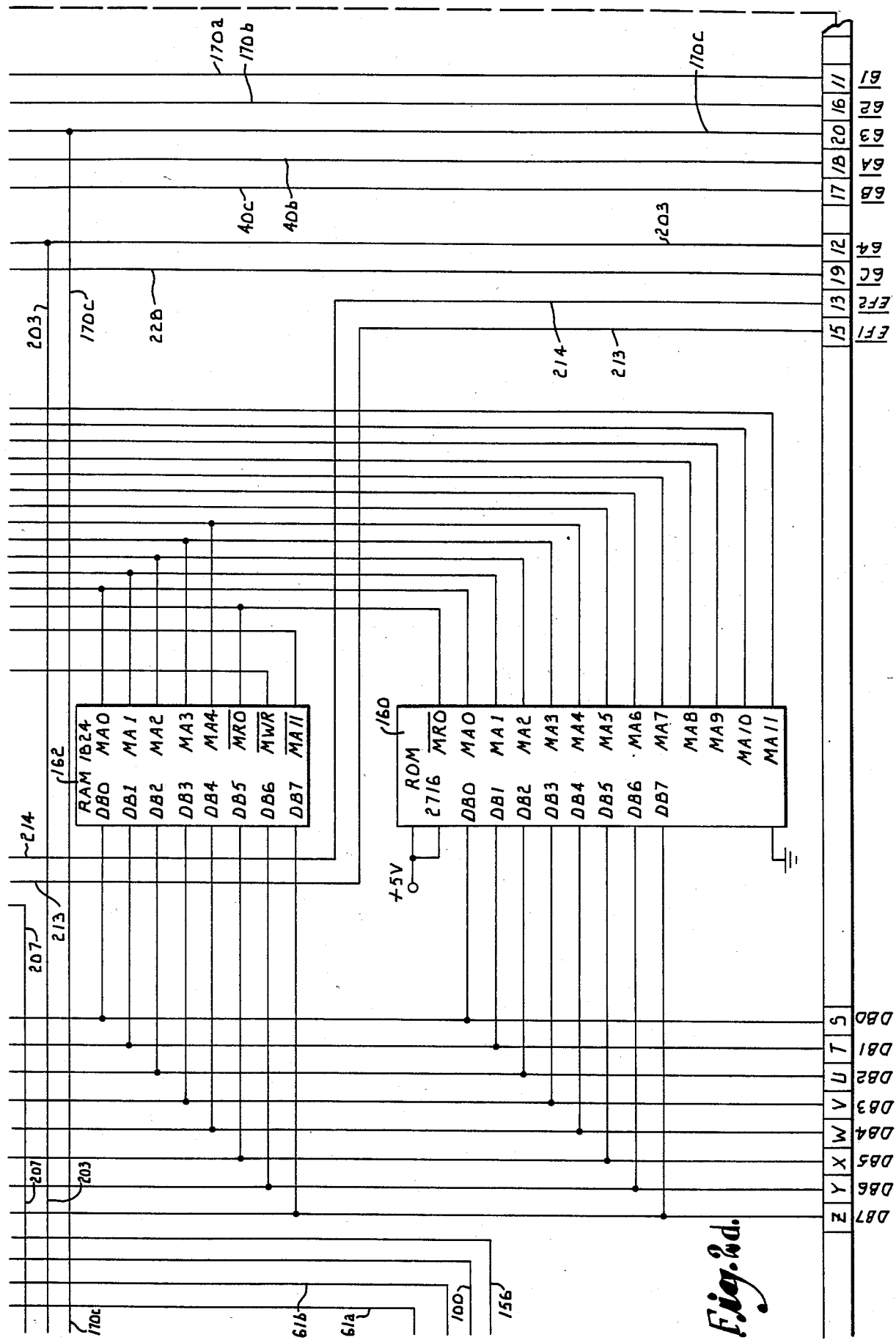

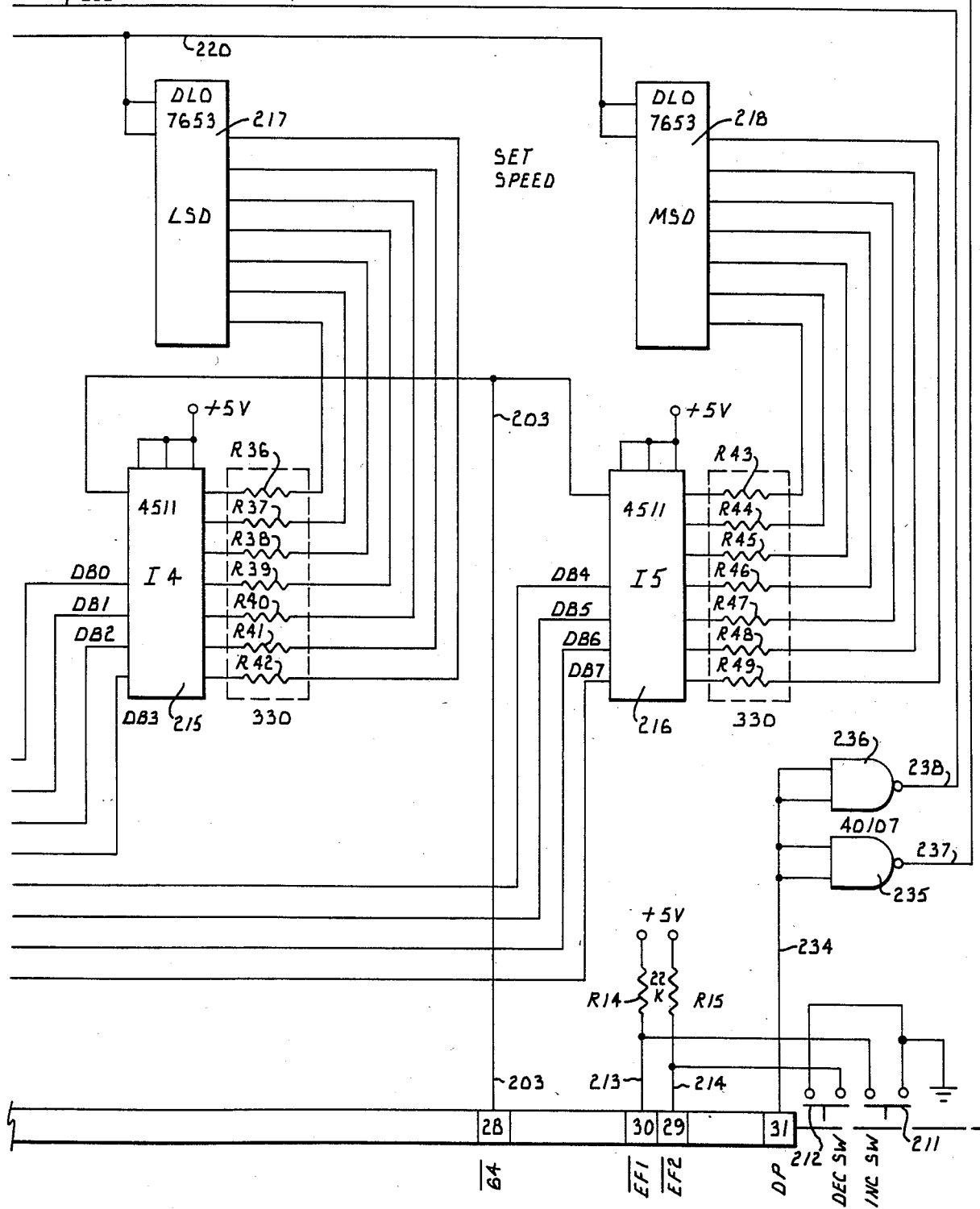

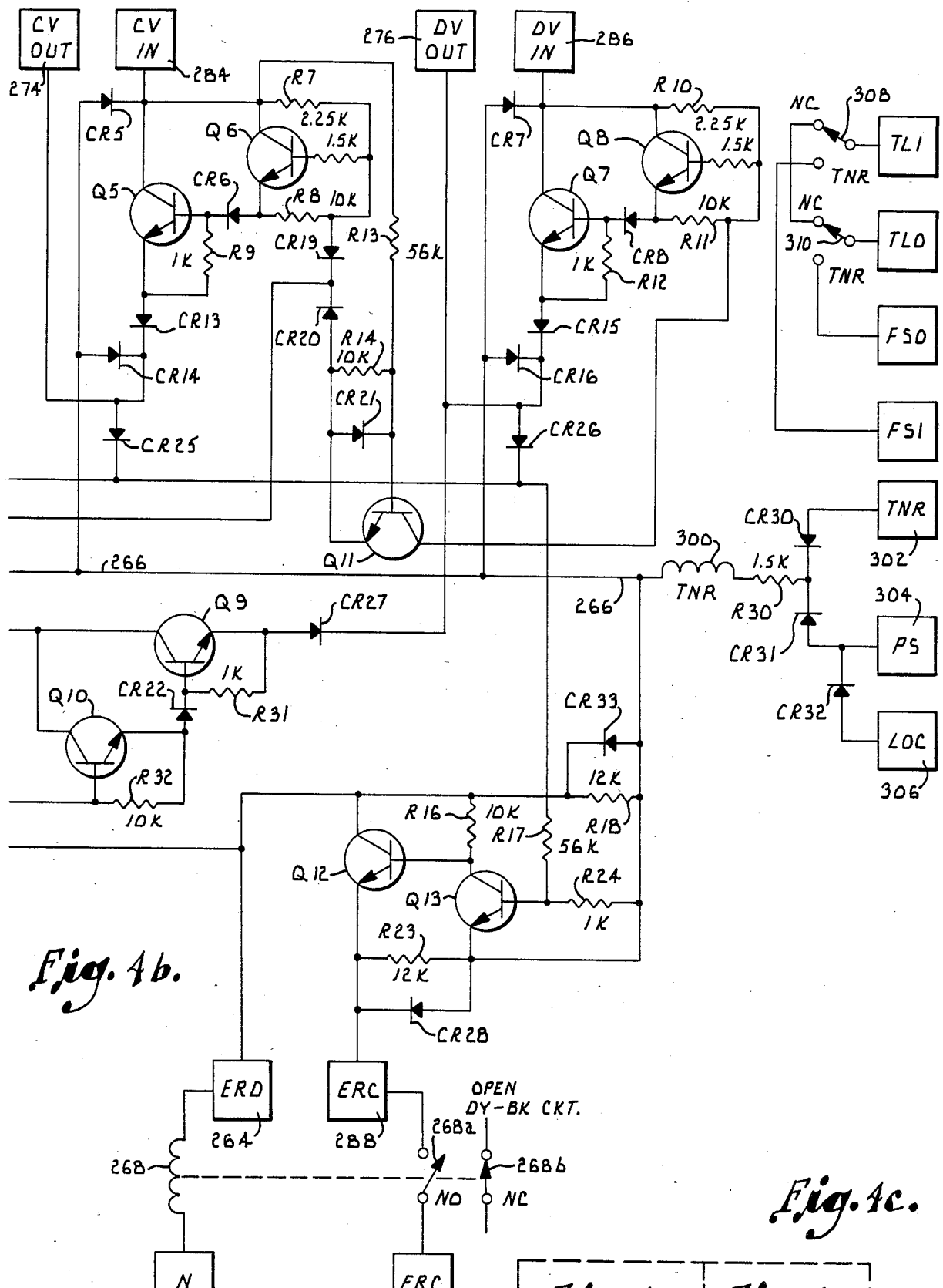

FUEL EFFICIENT CONTROL OF MULTIPLE UNIT LOCOMOTIVE CONSISTS

BACKGROUND AND SUMMARY OF THE INVENTION

This invention relates in general to the fuel efficient control of multiple unit locomotive consists. More particularly, the invention is directed to improvements in the type of control system disclosed in pending application Ser. No. 165,724, filed July 3, 1980 in the name of Rudolph D. Spigarelli, John L. Aker and Fred M. Berry.

As described in the aforementioned application, substantial fuel savings can be achieved in the operation of multiple unit locomotive consists if the diesel electric locomotive engines are controlled such that they operate at either the full power No. 8 setting, the half power No. 5 setting, or the No. 1 throttle setting which is essentially the idle engine position giving minimal power. The desired train speed can normally be maintained with this arrangement, and the consist operates efficiently because what locomotive units are needed are for the most part operated at the fuel efficient No. 8 throttle position. At any given time, one locomotive at the most can be in the No. 5 throttle position.

The control apparatus disclosed in the aforementioned Spigarelli et al application has proven to be highly effective in reducing the fuel consumption of locomotive consists and has been highly satisfactory for the most part. However, it has not been wholly free of problems. Perhaps most notably, it has been found in actual practice that the engineers at times apply the automatic air brake of the locomotive consists while the locomotives are operating under power. This not only wastes fuel but also adds unduly to the wear on the train wheels, brake shoes, and track. The added wear on the wheels and brake shoes alone increases the operating and maintenance costs by significant amounts.

Another problem has been that application of the dynamic brake takes the consist out of the fuel save mode of operation, and the engineer can then control the consist manually. It is generally desirable to provide the engineer with manual throttle control when he returns the consist to power from the dynamic brake mode, since he must apply sufficient power to gradually stretch the train from the "bunched" condition that occurs in the dynamic brake mode. However, since many engineers have resisted the device because it takes away some of their control of the consist, there is a tendency for some engineers to apply the dynamic brake solely for the purpose of gaining manual control. Consequently, the dynamic brake is overused and the fuel saver device is not utilized to full advantage. In addition, it has been possible for the engineer to set the speed of the locomotive consist at an unduly high or low level, thus operating the consist at speeds outside of the accepted range.

The system of the aforementioned patent application also requires a number of relays which must be wired into the circuitry at the proper locations. The need for numerous relays and the attendant wiring adds significantly to the costs and the time required for installation, and the relays also detract somewhat from the reliability of the system.

The present invention is directed toward an improved control device for operating a multiple unit locomotive consist in a fuel efficient manner. In accordance with the invention, the locomotives in a multiple unit consist are controlled in essentially the same manner disclosed in the aforementioned Spigarelli et al patent application. In order to achieve efficiency in a fuel save mode of operation, each locomotive needed to maintain the desired speed is maintained at the fuel efficient No. 8 throttle setting, or at times at the half power No. 5 setting. Any locomotives not needed are placed in the No. 1 throttle position. Extended high horsepower power braking is avoided by automatically dropping all trailing locomotive units to the full power reduction status once the air brakes have been applied for a predetermined time, generally 30-60 seconds. Also eliminated is abuse of the dynamic brake for the purpose of getting control of the consist in the hands of the engineer. When the dynamic brake is released after having been applied for at least 30 seconds, an override period is initiated to give the engineer manual control of the consist for 90 seconds. The 90 second override period provides sufficient time for the engineer to gradually stretch out the train from the bunched condition, while the 30 second period required for initiation of the override period keeps the engineer from applying the dynamic brake for a minimal time just to gain control.

Another important feature of the invention is the provision of minimum and maximum speed setting switches which determine the range of speeds at which the control system operates to cause power reductions (except in the automatic air brake mode). The switches are inaccessible to the crew so that their settings cannot be altered without authorization. If the train speed drops below the minimum setting, the consist gradually reverts to manual control so that the engineer can handle it in the manner required to avoid problems.

An additional feature of significance is the use of solid state components to properly energize and deenergize the governor solenoids of the locomotive engines in accordance with commands that are issued from the control system. The use of solid state controls instead of numerous relays simplifies the installation and reduces the overall costs.

The invention also operates to restrict the dynamic brake loading to a preselected numer of axles, typically a maximum of 24 axles in accordance with normal industry practice. Although conventional practice provides switches in the cabs to allow selected units to be kept out of the dynamic brake mode, it has been found that the switches are not always used properly by railroad personnel. As a result, it is not uncommon on consists with a large number of locomotives for the dynamic brake loading to be applied to more than the allowed number of axles, thus creating instability and the possibility of derailment. The present invention eliminates this problem by providing switches which can be preset by authorized personnel to select the number of locomotives available for dynamic braking. Like the minimum and maximum switches, the switches used for selection of dynamic brake availability are inaccessible to crewmen. Automatic bypassing of units having a problem in the dynamic brake circuit is also provided so that such units are not selected as being available for dynamic braking.

DESCRIPTION OF THE DRAWINGS

In the accompanying drawings which form a part of the specification and are to be read in conjunction therewith:

FIGS. 1a–1d together form a schematic circuit diagram of the power supply circuit board included in a control device constructed according to a preferred embodiment of the present invention;

FIG. 1e is an organizational diagram showing the manner in which FIGS. 1a–1d are to be arranged;

FIGS. 2a–2d together form a schematic circuit diagram of the logic circuit board included in the control device;

FIG. 2e is an organizational diagram showing the manner in which FIGS. 2a–2d are to be arranged;

FIGS. 3a–3c together form a schematic circuit diagram of the display circuit board included in the control device;

FIG. 3d is an organizational diagram showing the manner in which FIGS. 3a–3c are to be arranged;

FIGS. 4a and 4b together form a schematic circuit diagram showing the panel circuitry included in the control device;

FIG. 4c is an organizational diagram showing the manner in which FIGS. 4a and 4b are to be arranged;

DETAILED DESCRIPTION OF THE INVENTION

The present invention provides a locomotive control device which is for the most part identical to the device disclosed in pending patent application Ser. No. 165,724, filed on July 3, 1980 in the names of Rudolph D. Spigarelli, John L. Aker and Fred M. Berry, now U.S. Pat. No. 4,401,035, issued Aug. 30, 1983, which application is incorporated herein by reference. The device controls the operation of a plurality of diesel locomotives included in a multiple unit locomotive system or consist. Ordinarily, the trottle setting of each locomotive is controlled by the throttle setting of one of the locomotives designated as the lead unit. The remaining units are referred to as trail units. In normal operation, each locomotive in the consist has the same throttle setting, and peak efficiency is not achieved.

The present invention is directed to a control device which functions to maintain the locomotive consist at or near peak operating efficiency at all times and at all speeds of the consist. In accordance with the invention, each diesel electric locomotive in a multiple unit locomotive consist is provided with a microprocessor 10 (FIG. 2b) which may be an RCA 1802 COSMAC microprocessor.

Figure 2A:
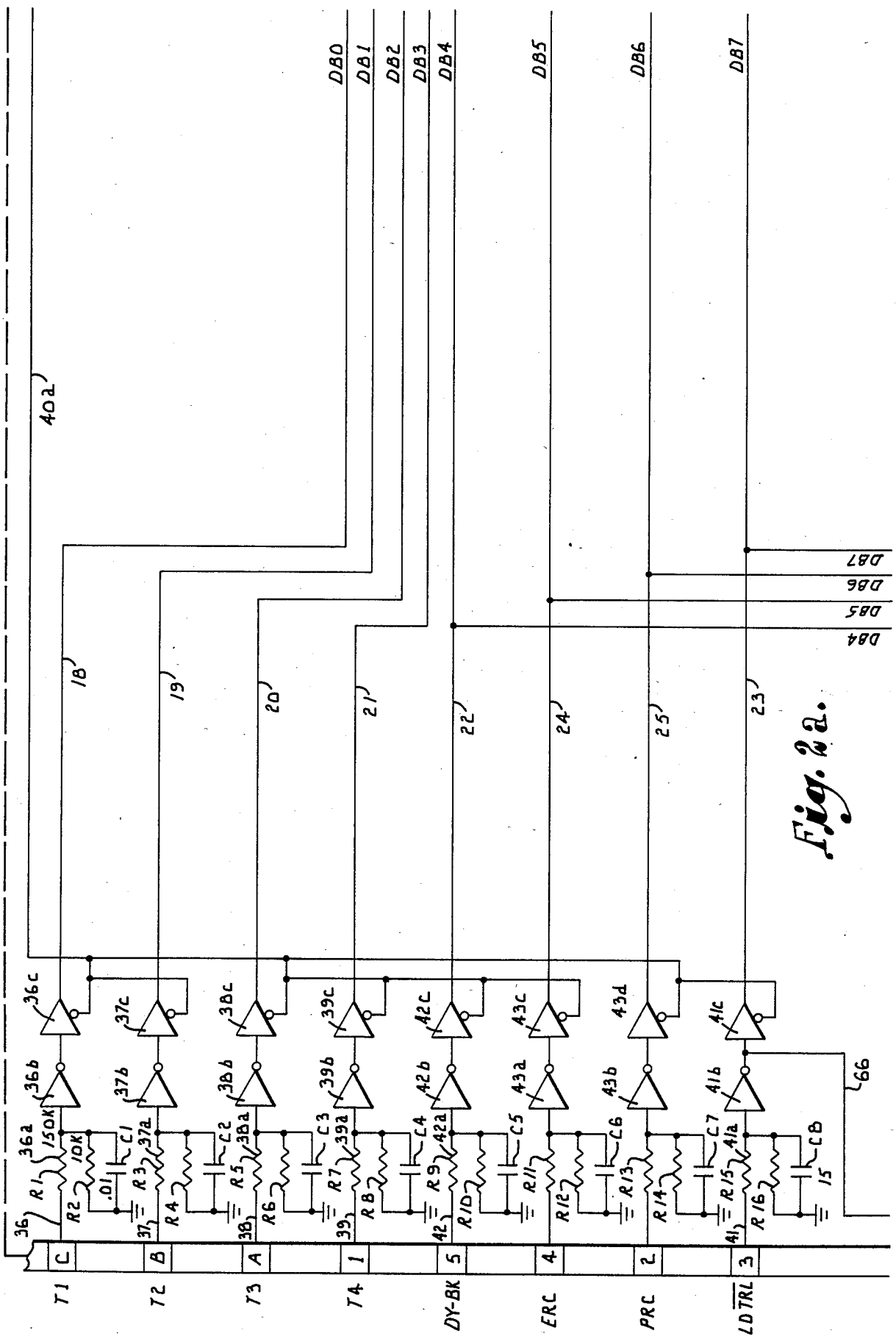

Referring additionally to FIG. 2a, the inputs to microprocessor 10 include four throttle inputs T1–T4 which connect with respective throttle lines 36–39. The throttle inputs are coded in a manner to provide information as to the throttle setting of the locomotive. The four throttle lines are coded such that they provide 8 information states corresponding to the 8 throttle positions of the locomotive. The No. 1 throttle position is essentially an idle engine speed, and the throttle positions increase in power output as they ascend toward the full power No. 8 throttle setting. The signals applied to lines 36–39 are applied through 150K ohm resistors 36a–39a and are conditioned by Schmidt trigger inverters 36b–39b prior to encountering tri-state buffer circuits 36c–39c which are turned on when a low output signal is present on line 40a of a decoder circuit 40 (see FIG. 2b) associated with microprocessor 10. The tri-state buffers 36c–39c are enabled on by the microprocessor when it calls for information as to the throttle line condition, and the buffers apply a signal indicative of the throttle line conditions to the respective lines 18–21 which connect to data bus terminals DB0, DB1, DB2 and DB3 of microprocessor 10.

The condition of the dynamic brake of the locomotive is similarly applied as an input to the microprocessor since it is not desirable to operate the locomotive consist in the fuel save mode if the dynamic brake is applied. A signal indicative of the on or off condition of the dynamic brake is applied to line 42 and through a resistor 42a and an inverter 42b to a tri-state buffer 42c which is enabled on by the microprocessor when an output is present on line 40a. The signal is then applied to the buffer output line 22 and to data bus DB4 of the microprocessor. A lead or trail input line 41 is connected through resistor 41a, inverter 41b, and tri-state buffer 41c to data bus DB7 via line 23. The lead or trail input provides the microprocessor with an indication as to whether the locomotive is a lead or trail unit, as will be explained in more detail.

Additional inputs to the microprocessor are applied to ERC (engine run dropout check) and PRC (power reduction check) inputs which connect through respective resistors R11 and R13 with Schmidt trigger inverters 43a and 43b and buffer circuits 43c and 43d controlled by line 40a. The output lines 24 and 25 of the respective buffers 43c and 43d connect with data buses DB5 and DB6 of the microprocessor 10.

FIG. 2c illustrates a circuit which provides the speed information of the locomotive system to microprocessor 10. Numeral 44 designates the secondary coil of a transformer having a primary coil 44a which is connected with two TACH inputs. The TACH inputs are in turn connected with a tachometer (not shown) in the form of a pulse generator having an output frequency proportional to the speed of the locomotive. The tachometer can be an electromagnetic device of conventional construction which is geared to the wheel in a manner to provide a preselected number of pulses (such as 60 or 20, for example) for every revolution of the locomotive wheel. These pulse signals are isolated by the transformer, and are applied to secondary coil 44 and to a limiting resistor R23. The side of coil 44 opposite resistor R23 is tied to a common line 46 which is common to all of the electronics of the control device. A pair of diodes 47 and 48 are connected back to back in reverse, and capacitors C20 and C8 act to square up the waveform and filter out noise. Another resistor 50 is included in the circuit, along with another capacitor C9 providing additional filtering.

The pulse signals are fed into a comparitor circuit 53 which functions in essentially the same manner as an operational amplifier with a high gain characteristic. The negative input side of comparitor 53 is connected with a resistor 50, while the positive input side is connected to common through 1K resistor R30. A positive feed back from the output pin of comparitor 53 is provided through resistor 57. A positive potential of 5 volts is applied to the comparitor output through a registor R32.

The output signal from comparitor 53 is applied to an exclusive OR gate arrangement having gates 58 and 59, resistor R33 and capacitor C10 which function as a frequency doubling circuit. The output signal from gate 59 is applied to the clock input of a flipflop circuit 60. The sharp pulses applied to the clock input trigger the flipflop circuit 60 to its on condition and provide an output signal on the $\overline{Q}$ output line 61a which connects to the interrupt $\overline{INT}$ of the microprocessor 10. The microprocessor is thus interrupted each time a pulse is received during the speed measuring part of the software (otherwise $\overline{INT}$ is ignored), and it immediately resets flipflop circuit 60 for receipt of another pulse by applying a signal on the SC1 line 61b of the microprocessor which connects to the reset pin R of the flipflop circuit. In this manner, the microprocessor counts the pulses on a timed basis (equivalent to 1000 pulses equalling 100.0 mph to receive information as to the actual speed of the locomotive system as measured by the tachometer. It is contemplated that alternative methods of providing signals indicative of the speed may be used, such as radar, for example.

FIG. 1c illustrates a dip switch arrangement that can be used to calibrate the speed input circuit in order to compensate for wear on the locomotive wheels which causes a change in their circumference and thus a change in the ground speed relative to the rotational speed of the wheels. The FIG. 1c circuit is used to provide to the microprocessor, under program control, a selected number which is used to correlate the rotational speed of the wheels to the ground speed of the locomotive system. Four switches 62–65 may be set in closed and open positions in any combination to provide different constant number which recalibrate the speed input measurement when the wheel wears sufficiently to give inaccurate speed readings. One side of each switch is tied to +5 volts and the switches are connected to common on their opposite sides through resistors R12–R15. When the switches 62–65 are closed, high signals are applied to the inputs to tri-state buffer circuits 62a–65a which are enabled when an input signal appears on the 6B input stroke line 40c of circuit 40. When the buffers 62a–65a are enabled, their output signals are applied to the microprocessor on the data bus lines DB0, DB1, DB2 and DB3, respectively.

Referring now to FIGS. 2a and 2c together, the lead or trail line 41 applies its input signal to another line 66 which connects between inverter 41b and buffer circuit 41c. The lead or trail line 41 includes the pressure switch (not shown) which is included in the air brake system of the locomotive and which is preset in the closed position if the locomotive is a lead unit and in the open position if the locomotive is a trail unit. Since the air switches must be properly set in any event, there is no separate procedure required in order to designate which locomotive is the lead unit and which are the trail units. If the pressure switch is closed to provide a high signal on line 41, the locomotive is a lead unit; otherwise, it is a trail unit. It is to be understood that determination of the lead unit can be made in other ways, such as by movement of the reverser handle, for example.

The signal appearing on line 66 is applied to a buffer 90 and an inverter 91 prior to forming one input to NAND gate 99. The other input to NAND gate 99 is applied thereto on line 100 which is the Q output line of the microprocessor 10. The output of gate 99 is applied to an inverter 101 and through a resistor R42 to the base of a transistor Q6 forming part of a power amplifier and voltage regulator circuit or signalling circuit which also includes transistors Q7 and Q5. Also connected to the base of transistor Q6 through resistor R43 is the output side of an inverter circuit 98 having its input tied to another inverter 103. Line 100 connects with the input side of inverter 103. The voltage applied to the base of transistor Q6 is a reference voltage (applied only when line 100 is high) which has one value when the lead or trail line 41 is a logic one level, as when the locomotive is a lead unit, and a different value when line 41 is a logic zero level, as when the locomotive is a trail unit.

A potential of about 74 volts is applied to line 106 of the voltage regulator circuit. Line 106 leads to the collector electrode of transistor Q5 and connects through resistor R38 with the base of transistor Q7 and the collector of transistor Q6. Resistor R58 is interposed between line 106 and the emitter of transistor Q7. The emitter electrodes of transistors Q5 and Q6 are connected together through a resistor R41 to common. The base of transistor Q5 is connected through a resistor R39 with an output line 116 leading from the collector of transistor Q7. Resistor R40 is tied between common and the base of transistor Q5.

When the base of transistor Q6 is turned on due to the presence of a pulse on the Q output line 100 of the microprocessor, transistor Q6 is conductive and transistor Q7 is in turn switched to the conductive state such that a positive voltage is applied to line 116. Due to the negative feedback arrangement (resistor R41) of the circuit and the voltage divider arrangement associated with the base of transistor Q5, the voltage applied to its base is forced to correspond to the voltage applied to the base of transistor Q6. The components of the circuit are selected such that when the Q output line for the lead unit goes high to set one reference voltage on the base of transistor Q6 (and also Q5), a 63 volt pulse is keyed onto line 116. The logic level on the output line of NAND gate 99 determines the voltage applied to the base of transistor Q6 during a pulse on the Q output line of the microprocessor. When the Q line for a trail unit goes high to set a lower reference voltage on the base of transistor Q6, line 116 receives a 30 volt pulse. The circuit thus keys 30 volts on line 116 for a trail unit and 60 volts for a lead unit under the timed control of the Q output line of microprocessor 10.

The output line 116 of the communication output circuit leads through a diode 118 to a node 119 which is tied to the collector of a cut through switch transistor Q9. Lines 120 and 121 also connect from node 119 through diodes CR10 and CR12. Line 120 connects with an incoming portion 125 of the "No. 18" train line wire (designated for fuel saving devices), and line 121 connects with the outgoing portion 126 of the train line wire. Lines 125 and 126 are also connected with the emitter of transistor Q9 through respective diodes CR9 and CR8. Transistor Q9 connects the TL1 line 125 to the TL2 line 126 to short through the train line when the transistor is conductive.

Transistor Q9 is turned on and off under the control of microprocessor 10. Numeral 134 designates a 4076 latch circuit having a conductor 135 connected with its Q4 output pin. Conductor 135 connects with the base of a transistor Q8 through a buffer 136 and a resistor R55. The base of transistor Q8 is connected to common through a resistor 138. The emitter of transistor Q8 is common, while its collector is connected through a resistor R56 to the base of transistor Q9. A resistor R50 is tied between the base and the emitter electrode of transistor Q9.

The positive input side of a 3290 receiver comparitor circuit 144 is connected with the diode bridge circuit through a resistor R48 which is connected with the emitter of transistor Q9. The Q output line 100 of the microprocessor connects with the negative input side of comparitor 144 through a resistor R60 and a diode CR17. A positive potential of five volts is applied to the negative input of comparitor 144 through a resistor R46. Also connected to the negative input of the comparitor through resistor R44 is the output side of buffer 90. The circuit further includes resistors R45 and R47 and capacitor C11. A diode 154 is tied between the positive input to the comparitor and +5 volts. Comparitor 144 provides an output on line 156 which connects with the EF4 input flag of microprocessor 10. Line 156 is connected with +5 volts through a resistor R53. Another resistor R52 is tied between the output side of the comparitor and the positive input pin.

The threshold voltage at which comparitor 144 provides an output on line 156 to the EF4 flag of the microprocessor is set by the voltage on line 66, which varies depending upon the condition of the Q line of the microprocessor and whether the locomotive is a lead unit or a trail unit. The components are chosen such that an output will appear on line 156 if there is a lead unit input on line 66 and a voltage greater than about 17 volts is applied to the diode bridge circuit from the incoming train line. Accordingly, the lead unit will respond to all 30 volt signals corresponding to signals from any of the trail units. An output will appear on the output line 156 of the trail units if a trail unit input is present on line 66 only when the signal at the diode bridge circuit is greater than about 50 volts (while the microprocessor Q line is low). The trail units will thus respond to 63 volt signals from the lead unit but not to 30 volt signals from other trail units. The condition of line 66, which depends upon the status of the locomotive as a lead or trail unit, is used as the reference input to comparitor 144 to control the response of the comparitor upon its receipt of the various signals which are transmitted along the "No. 18" train line wire. Resistor R60 and capacitor CR17 raise the comparitor voltage to 59 volts for the lead unit. If the comparitor output is not sufficiently high following communication to trailing units, the software shuts off the microprocessor Q line because excessive current is being drawn through transistor Q7 and the 100 ohm, 5 watt resistor R58.

FIG. 2d illustrates a read only or program memory which is generally designated by reference numeral 160 and a random access memory 162. The various input and output lines of the ROM 160 and RAM 162 connect with the corresponding lines of the microprocessor 10 and the other circuit components. Also included in the microprocessor system is a memory address latch circuit 163 (FIG. 2b) having memory address lines which connect with the corresponding memory address lines of the microprocessor 10 in a conventional manner.

FIG. 2b also depicts a timing circuit having a pair of 4040 integrated circuits 165 and 166. Circuit 165 connects with a TPA line 167 which leads from the TPA output of the microprocessor. Line 168 extends from circuit 166 to the EF3 flag of the microprocessor. The timing circuit is a frequency divider which operates from a crystal controlled oscillator 169 associated with microprocessor to provide one second pulses to the microprocessor on line 168.

With continued reference to FIG. 2b, the commands for input and output information are controlled by the decoder circuit 40 and by another decoder circuit 170. The N0 and N1 outputs of the microprocessor are both connected with each circuit 40 and 170. The memory read output $\overline{\text{MRD}}$ of the microprocessor connects with circuit 40 through an inverter 171. The output from inverter 171 also connects with one input pin of a NAND gate 173 which receives its other input on the TPB line 174 of the microprocessor. The output signal from gate 173 is applied to decoder circuit 170. Output line 40a of decoder circuit 40 serves to turn on the tri-state buffer circuits 36c–39c, 41c–43c and 43d, as previously indicated. The remaining output lines from circuits 40 and 170 function in a manner that will be described hereinafter.

If the voltage on the memory read line $\overline{\text{MRD}}$ is high, a low voltage from inverter 171 enables circut 40. If, at the same time as the $\overline{\text{MRD}}$ line is high, the N0 and N1 lines of the microprocessor, or both, are high, an output from circuit 40 appears on line 40a, line 40b or line 40c, depending upon the conditions of the N0 or N1 output pins of the microprocessor. Conversely, if the $\overline{\text{MRD}}$ line is low and the TPB line of the processor is high, an enabling output is applied from NAND gate 173 to decoder circuit 170, and, if either the N0 or N1 output, or both, are also high, circuit 170 provides an output on the $\overline{61}$ line 170a, the $\overline{62}$ line 170b or the $\overline{63}$ line 170c.

The clock input pin of latch circut 134 (FIG. 2c) is connected with the $\overline{63}$ output line 170c of decoder circuit 170. In addition to the output provided on line 135, circuit 134 applies output signals to buffer circuits 179 and 180. The output lines of buffers 179 and 180 connect through resistors R29 and R27 with the bases of transistors Q2 and Q4 respectively. The transistor emitters are common and their bases are connected to common through resistors R28 and R26. The collectors of transistors Q2 and Q4 are connected through resistors R17 and R22 with the bases of additional transistors Q1 and Q3. A positive 74 volt potential is applied to the bases of transistors Q1 and Q3 through resistors R18 and R21 and to the emitters through resistors R19 and R20. The collector of transistor Q1 is connected through diode CR1 with an ERD (engine run dropout) terminal 190. The collector of transistor Q3 is similarly connected through diode CR3 with a PRR (power reduction) terminal 192. Diodes CR1, CR2, CR3 and CR4 prevent voltage spikes.

With continued reference to FIG. 2c in particular, the latch circuit 134 is reset under the control of a 4013 latch (watchdog) circuit 202 which functions in the manner of a one shot circuit. The S terminal of circuit 202 is common, while its clock terminal is connected with a conductor 203 which is the output line ($\overline{64}$ command) of a three input NAND gate 204 (FIG. 2b). The three inputs to gate 204 are applied on the microprocessor TPB output, the N2 output, and the $\overline{\text{MRD}}$ output via inverter 171. The data input pin D is connected to +5 volts. The Q output line 204 of circuit 202 has a diode CR14 and a resistor R59. Line 204 connects through resistor R36 with the input to a Schmidt trigger inverter 205 and through resistor R35 with the output side of the inverter. The output side of inverter 205 is connected with common through resistor R37. The output signal from inverter 205 is applied to the reset terminal of circuit 134 and to a Schmidt trigger inverter 206 having its output line 207 tied to the clear input CLR of the microprocessor.

The 4013 latch (watchdog) circuit 202 prevents the microprocessor 10 from operating improperly in the event of a momentary power lapse or transient. When commands to provide output are being applied to microprocessor output N2, the N2 output triggers circuit 202 to provide a high output pulse on line 204. Capacitor C12 is then charged and a high output will appear on the CLR (clear) line 207. Thus, if pulses continue, capacitor C12 remains charged and the clear line remains high. However, if there is a power lapse, or the associated program fails to execute the output function, the Q line 204 of watchdog circuit 202 stays low, capacitor C12 discharges, and the clear line 207 goes low and resets microprocessor 10. Capacitor C12 then recharges through resistor R35 and the microprocessor resumes operation in the proper manner.

Figure 1A:
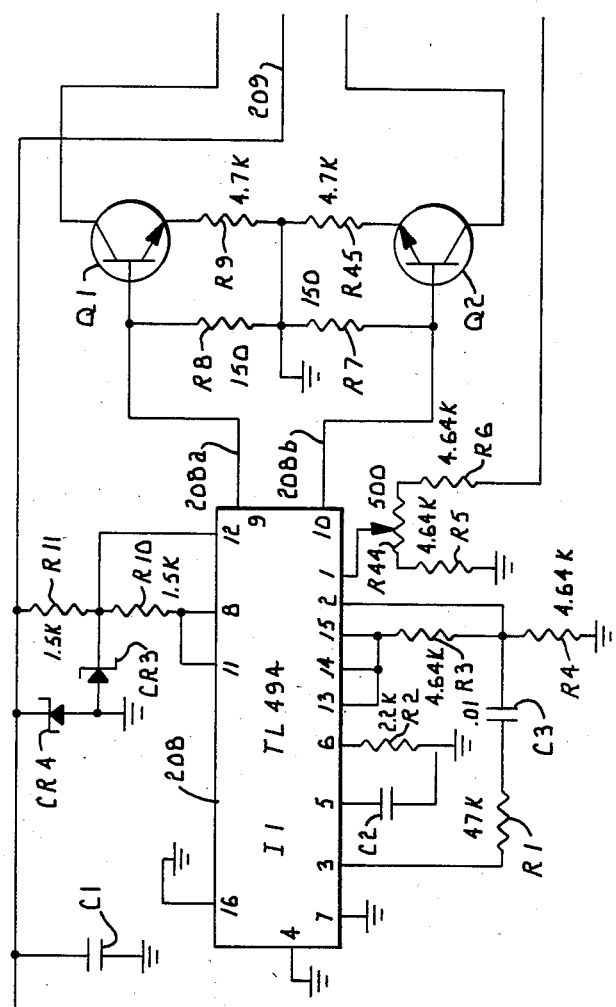
Figure 1A:
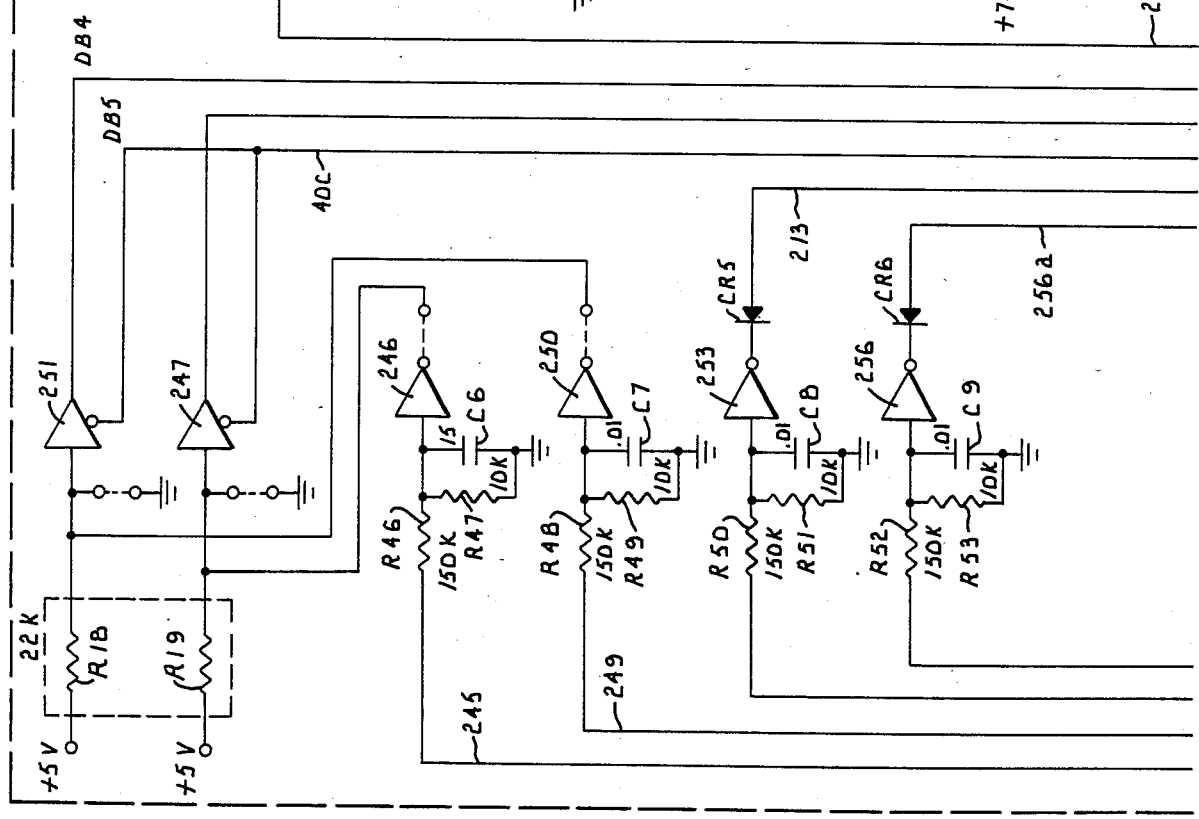
Figure 1B:
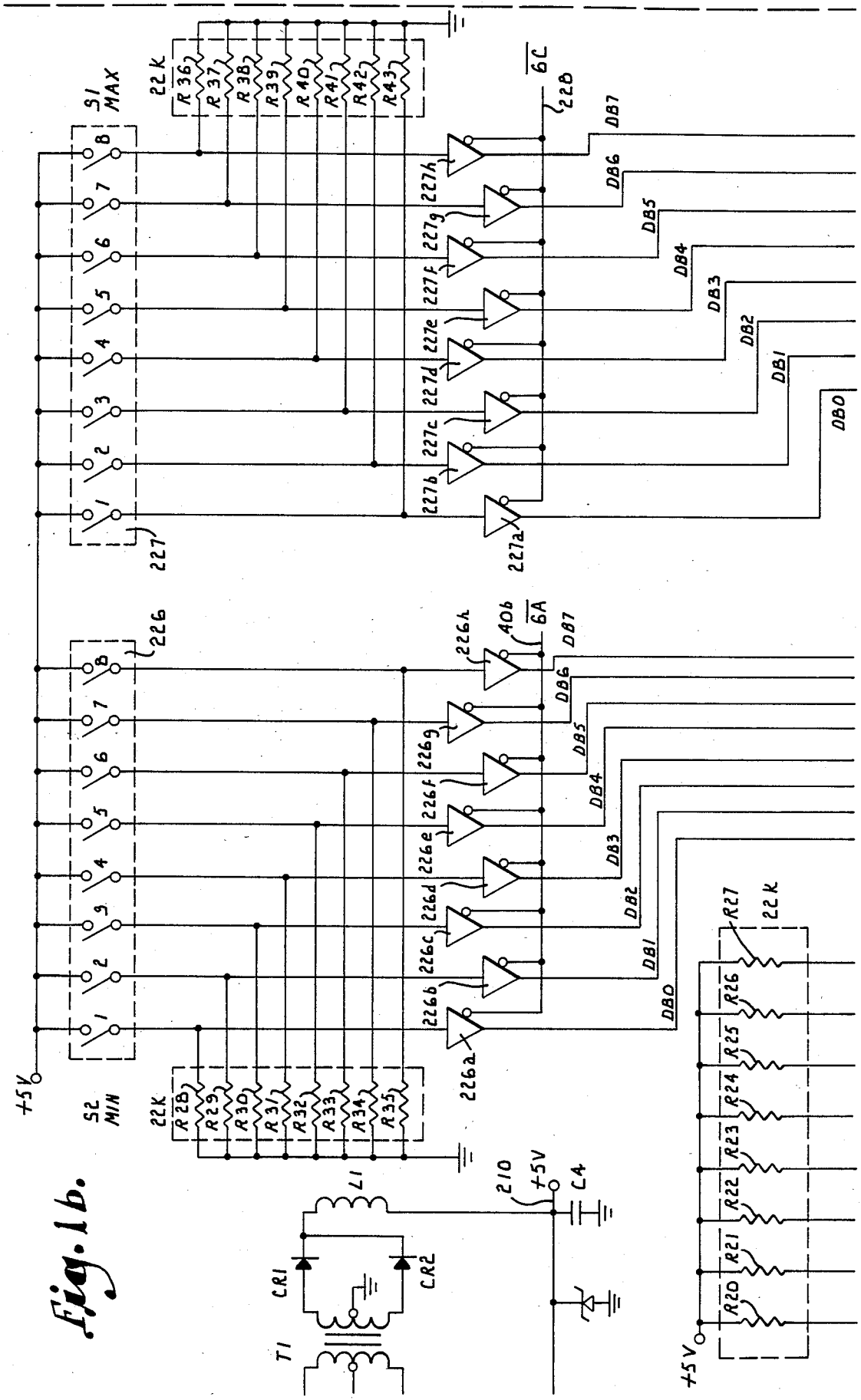

Referring now to FIGS. 1a and 1b, the power supply includes a TL 494 integrated circuit 208 having output lines 208a and 208b connected with the bases of respective transistors Q1 and Q2. The transistor bases are connected with common through resistors R8 and R7, and their emitters are connected with common through resistors R9 and R45. The collectors of transistors Q1 and Q2 are connected with opposite ends of the primary coil of a transformer T1. Tied to the primary transformer coil between its ends is a +74 volt line 209 which provides 74 volt power to the various components. The secondary coil of transformer T1 connects through diodes CR1 and CR2 and inductor L1 with a +5 volt line 210 which supplies the various components with 5 volt power.

The set speed at which it is desired for the locomotive consist to travel is controlled by an increment button 211 and a decrement button 212 shown in FIG. 3c. Buttons 211 and 212 control normally open switches and can be depressed to close the switches. Normally, +5 volts is applied through resistors R14 and R15 to lines 213 and 214 which connect with the respective EF1 and EF2 input flags of the microprocessor. When the increment button 211 is closed, the EF1 line 213 is shorted to common to remove the 5 volt signal. Under program control, the microprocessor 10 begins to increment the speed setting and continues to do so (to a maximum limit controlled by the software) until the increments button 211 is released to open it. Similarly, the decrement button 212 can be closed to remove the +5 volt signal from the EF2 line 214, thus causing the microprocessor to decrement the speed setting (to a software controlled minimum limit) so long as the decrement button remains depressed. The increment button 211 has precedence over the decrement button 212 if both are depressed.

With continued reference to FIG. 3c in particular, a visual display of the set speed is provided. Decoder latch circuits 215 and 216 receive inputs from the data bus lines of the microprocessor and are controlled by the ($\overline{64}$) output line 203 from the three input NAND gate 204 (FIG. 2b) which receives its inputs from the microprocessor via the $\overline{MRD}$, TPB and N2 outputs. The latch circuits 215 and 216 decode the input information and, under the control of line 203, latch up the data from the data buses and apply output signals to respective LED displays 217 and 218 through banks of resistors R36-R42 and R43-R49. The coded output signals from the latch circuits 215 and 216 cause the LED displays 217 and 218 to visually display integers representing the one's and ten's place of the set speed which is controlled by the increment and decrement buttons 211 and 212. The internal counter which causes the microprocessor to increment or decrement the speed setting provides data to the latch circuits 215 and 216 on the data bus line, which data is latched in on the $\overline{64}$ output line 203.

Figure 3A:
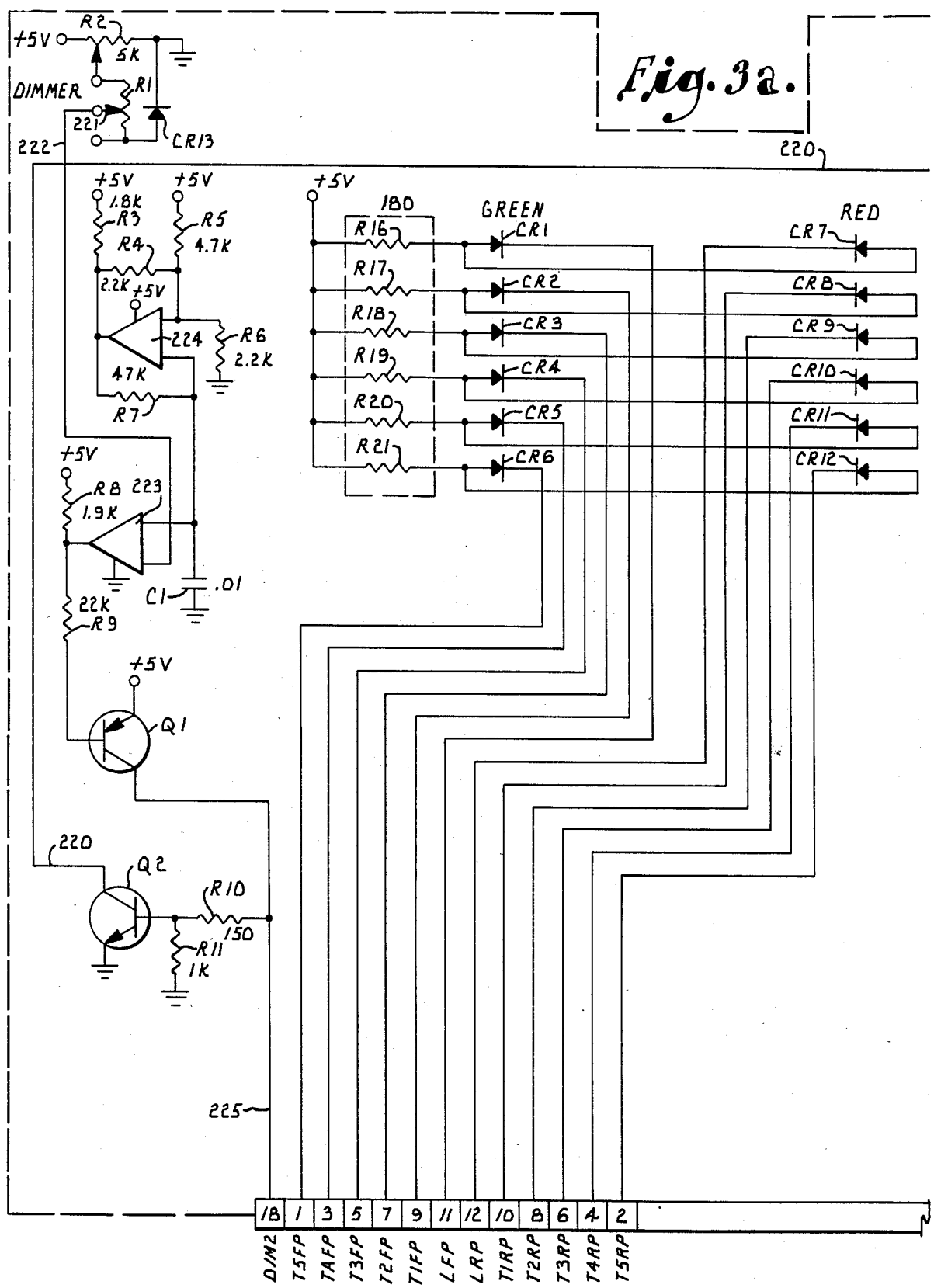

The intensity of the LED displays 217 and 218 is controlled by the condition of line 220 which connects with the LED displays and with common through a transistor designated Q2 in FIG. 3a. The condition of line 220 is in turn controlled by a dimmer circuit having a potentrometer 221 connected with +5 volts on one side and with line 222 on the other side. The setting of the potentrometer 221 determines the reference voltage imposed on a comparitor 223. Another comparitor 224 produces a triangle waveform output which is applied to the other comparitor 223.

The output signal from circuit 223 is applied through resistor R9 to the base of a transistor Q1. A positive potential of 5 volts is also applied to the output line of circuit 223 through a resistor R8. When transistor Q1 is in a conductive state, +5 volts is applied to line 225 and through resistor R10 to the base of another transistor Q2. When transistor Q2 is fully conductive, line 220 is grounded to let current flow through the seven segment displays. The dimmer operates by duty cycle modulation since comparitor 223 compares the reference voltage on line 222 with the triangle wave output from comparitor 224.

Minimum and maximum dip switches 226 and 227 (FIG. 1b) control the minimum and maximum speeds that can be set by the increment and decrement buttons 211 and 212. The minimum speed switch includes a series of switches which can be closed to apply +5 volts to buffers 226a-226h. The input sides of the buffers are grounded through resistors R28-R35. The output sides of the buffers 226a-226h are connected with the repsective data bus lines DB0-DB7 of the microprocessor. The buffers are turned on by the $\overline{6A}$ line 40b which is one output of circuit 40. As will be explained more fully, it is contemplated that only switches 1-5 of the minimum speed switch 226 will be used for setting of the minimum speed.

The maximum speed switch 227 similarly includes a series of switches which can be closed to apply +5 volts to the inputs of respective buffers 227a-227h. The input sides of the buffers are connected to system ground through resistors R36-R43. The output sides of buffers 227a-227h connect with the respective data bus lines DB0-DB7 of the microprocessor. A $\overline{6C}$ line 228 turns on the buffers 227a-227h. As shown in FIG. 2b, line 228 is the output line from a NAND gate 229 which receives its inputs from the microprocessor on the N2 and $\overline{MRD}$ lines.

The dip switches of the minimum and maximum speed setting switches 226 and 227 are opened and closed in the desired combination to set the minimum and maximum speed settings for the locomotive consist, and the information as to the minimum and maximum speeds is provided to the data bus of the microprocessor. Under program control, the microprocessor prevents the decrement switch 212 from setting the consist speed below the minimum setting and prevents the increment switch 211 from setting the consist speed above the maximum setting, although the desired speed can be set anywhere in the speed range between the minimum and maximum speed settings. Switches 226 and 227 are enclosed within a locked box and are thus inaccessible to crewmen. It is contemplated that the switches 226 and 227 will be set at the desired minimum and maximum speeds by authorized railroad personnel who will lock the box to prevent tampering.

With continued reference to FIG. 1b in particular, it is contemplated that only dip switches 1-5 of the minimum speed switch 226 will be required for setting of the minimum speed since they are sufficient to enter (binary coded) speeds up to 31 mph, which is well above the speed that will normally be set as the minimum. Accordingly, switches 6-8 can be used for other purposes. Switch No. 8, for example, can be used for testing.

Switches Nos. 6 and 7 can be used to select the locomotive units that are to be made available for dynamic braking. In order to prevent the application of excessive braking force which can lead to instability problems when the dynamic brake is applied, standard industry practice places a maximum on the number of axles which are to be loaded in dynamic brake. The maximum number of axles is typically 24 which is equivalent to 4 locmotives each having 6 axles or 6 locomotives each having 4 axles. When there are additional locomotives in the consist, it is necessary to disable the dynamic brake for such additional locomotives in order to avoid dynamic brake loading of more than the accepted number of axles. The units are normally equipped with manual switches which must be physically tripped by crewmen for the units that are to be made unavailable to the dynamic brake loading. However, it is not uncommon for crewmen to disregard procedure and fail to throw the proper switches, causing instability that can lead to derailment and other dangerous situations. For example, in an 8 locomotive consist having 6 axle locomotives, dynamic brake loading will be applied to all 48 axles (twice the acceptable number) if the crewmen fail to throw the switches for 4 of the units as would be expected.

In accordance with the present invention, dip switches 6 and 7 of switch 226 are used to select the number of locmotives which are made available for dynamic rake loading. A preferred coding system involves opening both the No. 6 and No. 7 switches to select 3 locomotive units, opening No. 7 and closing No. 6 to select 4 units, opening No. 6 and closing No. 7 to select 5 units, and closing both the No. 6 and No. 7 switches to select 6 units. The coded information is supplied through buffers 226f and 226g to the microprocessor on data buses DB5 and DB6. The effect of the setting of the No. 6 and No. 7 switches will be described hereinafter.

Figure 3B:
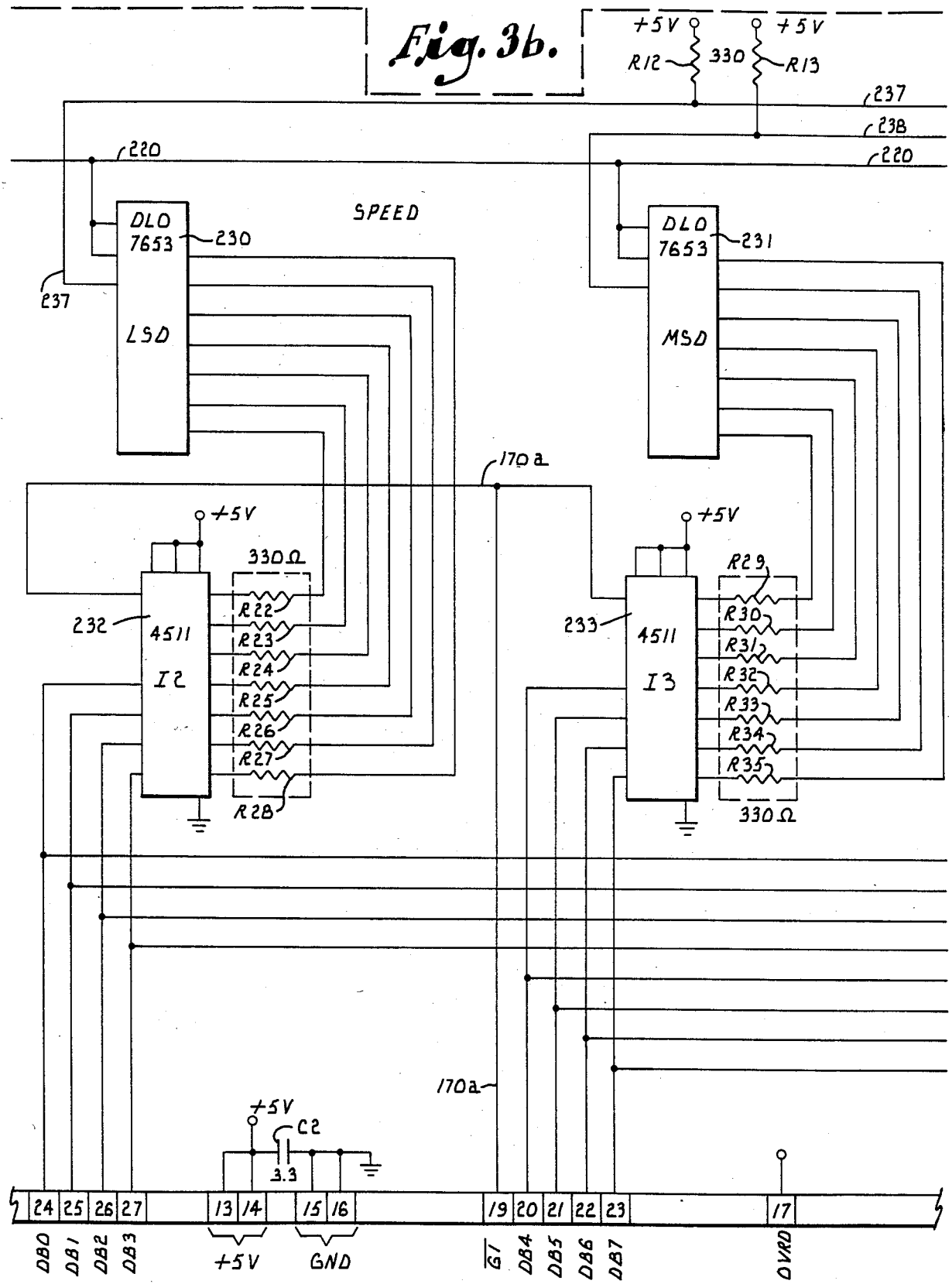

The actual speed at which the locomotive consist is travelling is visually displayed on a pair of LED displays 230 and 231 shown in FIG. 3b. Data bus lines DB0-DB3 provide inputs to a decoder latch circuit 232 having its outputs connected with LED 230 through resistors R22-R28. Another decoder latch circuit 233 receives inputs on the data bus lines DB4-DB7 and applies output signals through resistors R29-R35 to LED 231. The $\overline{61}$ line 170a from circuit 170 controls circuits 232 and 233. The latch circuits 232 and 233 receive information from the data bus of the microprocessor and decode the information under the control of line 170a to provide, on LEDs 230 and 231, a visual display of the integers representing the one's and ten's place of the actual speed of travel of the consist.

Line 220 connects with each LED display 230 and 231 to vary the intensity of the displays under the control of the dimmer potentiometer 221 discussed previously. The signal on the DP output line 234 of latch circuit 134 (see FIG. 2c) is applied to a pair of NAND gates 235 and 236 having output lines 237 and 238, respectively. Line 237 receives +5 volts through resistor R12 and thus applies a high signal to LED display 230 whenever there is a high output from gate 235. Similarly, line 238 applies +5 volts through resistor R13 to LED display 231 whenever there is a high output signal from gate 236.

Figure 1D:
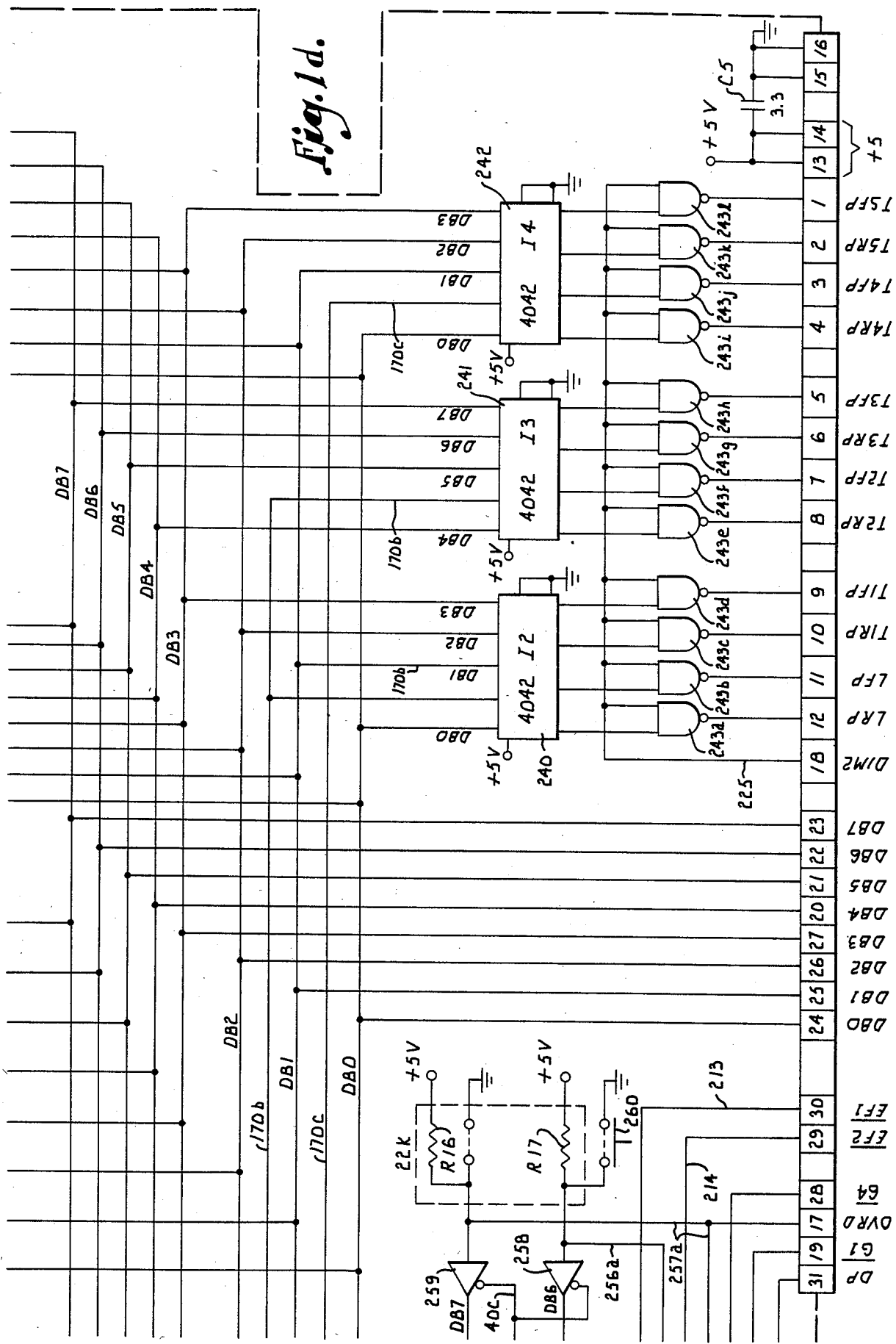

Referring now to FIG. 1d, the DB0-DB3 data bus lines connect with a latch circuit 240 which is controlled by the $\overline{62}$ output line 170b. Data bus lines DB4-DB7 connect with another latch 241 which is likewise controlled by line 170b. Another latch 242 receives the information on data bus lines DB0-DB3 and is controlled by the $\overline{63}$ line 170c. The output signals from latch 240 are applied to driver circuits 243a-243d. Latch 241 similarly applies its output signals to driver circuits 243e-243h. Additional driven circuits 243i-243l receive the output signals from latch 242. The second input to each driver 243a-243l is applied on the dimmer line 225 controlled by dimmer potentiometer 221.

Referring additionally to FIG. 3a, a positive potential of 5 volts is applied through resistors R16-R21 to a series of green LEDs CR1-CR6 and to a series of red LEDs CR7-CR12. The LEDs are arranged in pairs, with one red and one green LED included in each pair and each pair corresponding to one of the locomotive units. Thus, LEDs CR1 and CR7 correspond to the lead unit, LEDs CR2 and CR8 correspond to the first trail unit, LEDs CR3 and CR9 correspond to the second trail unit, LEDs CR4 and CR10 correspond to the third trail unit, LEDs CR5 and CR11 correspond to the fourth trail unit, and LEDs CR6 and CR12 correspond to the fifth trail unit. The output sides of drivers 243a-243l connect with the cathode sides of LEDs CR7, CR1, CR8, CR2, CR9, CR3, CR10, CR4, CR11, CR5, CR12 and CR6, respectively.

Under program control, the microprocessor 10 displays the fuel save status of each equipped locomotive on the LED display panel. For example, if a particular locomotive is operating at full power the green LED corresponding to such locomotive is energized. The red LED for the locomotive is energized if the locomotive is operating at half power and both the red and green LEDs are deenergized if the locomotive is in the full fuel save condition.

Referring now to the FIGS. 1c and 1a, an air brake signal is applied to input terminal 244 when the air brakes of the locomotive consist are applied. The air brake system is provided with a switch (not shown) that closes when the air brakes are applied to apply +74 volts to terminal 244 and the connected line 245. Line 245 connects with the input of a Schmidt trigger inverter 246 through resistor R46, with the voltage being reduced by resistor R47. The output signal from the inverter 246 is applied to the input side of a tri state buffer 247 which also receives +5 volts through resistor R19. Buffer 247 is controlled by the 6B line 40c and applies its output signal to data bus line DB5. When the air brakes are applied, the resulting signal applied to the microprocessor on data bus line DB5 initiates a program sequence that begins reducing trailing horsepower after a delay of a predetermined time (usually 30-60 seconds), as will be explained more fully.

Terminal 248 is normally held at +74 volts but is dropped to a low state if the locomotive is isolated or loses its power due to a malfunction. Line 249 connects terminal 248 with the input side of a Schmidt trigger inverter 250 through resistor R48. Buffer 251 receives the output signal from inverter 250 and also connects through resistor R18 with +5 volts. Line 40c turns the buffer 251 on and off to control the signal applied to the data bus line DB4 which connects with the output side of buffer 251.

When terminal 248 goes low, the microprocessor is so informed via data bus DB4 and, under program control, effects an output signal on line 135 of circuit 134 (see FIG. 2c). This signal makes transistor Q8 conductive which in turn makes transistor Q9 conductive. When transistor Q9 is conductive, all communication signals coming in on either train line 125 or 126 are immediately routed back out on the other train line so that the circuitry for the isolated or malfunctioning trailing locomotive is effectively bypassed. In this manner, isolated and malfunctioning locomotives are disregarded without having an adverse effect on the communication system.

Terminal 252 connects through resistor R50 with the input to a Schmidt trigger inverter 253. The output side of inverter 253 connects through diode CR5 with the EF1 line 213 to pull line 213 to the low state when a high signal is applied to terminal 252. This has the same effect as depressing the increment button 211. Terminals 254 and 255 similarly connect through resistors R52 and R56 with Schmidt trigger inverters 256 and 257. The output side of inverter 256 connects through diode CR6 with a conductor 256a which is in turn connected with the input of a tri-state buffer 258 (FIG. 1d). The input sides of buffers 258 and 259 are also connected with +5 volts through resistors R17 and R16. The buffers 258 and 259 are turned on and off by the $\overline{6B}$ line 40c and apply their output signals to data bus lines DB6 and DB7, respectively.

The input side of buffer 258 can be shorted to ground by closing a power reduction button 260. The input signal to buffer 258 is also removed via line 256a when there is a high input to terminal 254. When the power reduction button 260 is depressed or terminal 254 is in a high state, the microprocessor begins to drop power from the consist at a rate of one half unit of power per second. When terminals 254 and 255 are both in the high state to pull the input sides of buffers 258 and 259 low, the signal applied to the microprocessor on data buses DB6 and DB7 nullify the effect of the air brake signal applied to terminal 244 and also the effect of the minimum speed setting. When the input side of only buffer 258 is pulled low, power reduction occurs. When the input side of only buffer 259 is pulled low, a 60 second override is initiated.

In actual practice, terminals 252, 254 and 255 are tied together and used for radio remote control. When the terminals are provided with a high signal, the effect is to maintain the locomotive consist at the maximum speed setting. Terminal 252 increments the speed setting to the maximum permitted by the maximum speed switch 227, and terminals 254 and 255 override the air brake and minimum speed functions and cause power additions and reductions related to speed.

Terminal 261 connects through resistor R54 with the input side of a Schmidt trigger inverter 262. The output side of inverter 262 connects through diode CR7 with the EF2 line 214. When the terminal 261 is in a high state to provide a low output from inverter 262, line 214 is pulled low and the effect is the same as that resulting from depression of the decrement button 212.

Figure 4A:
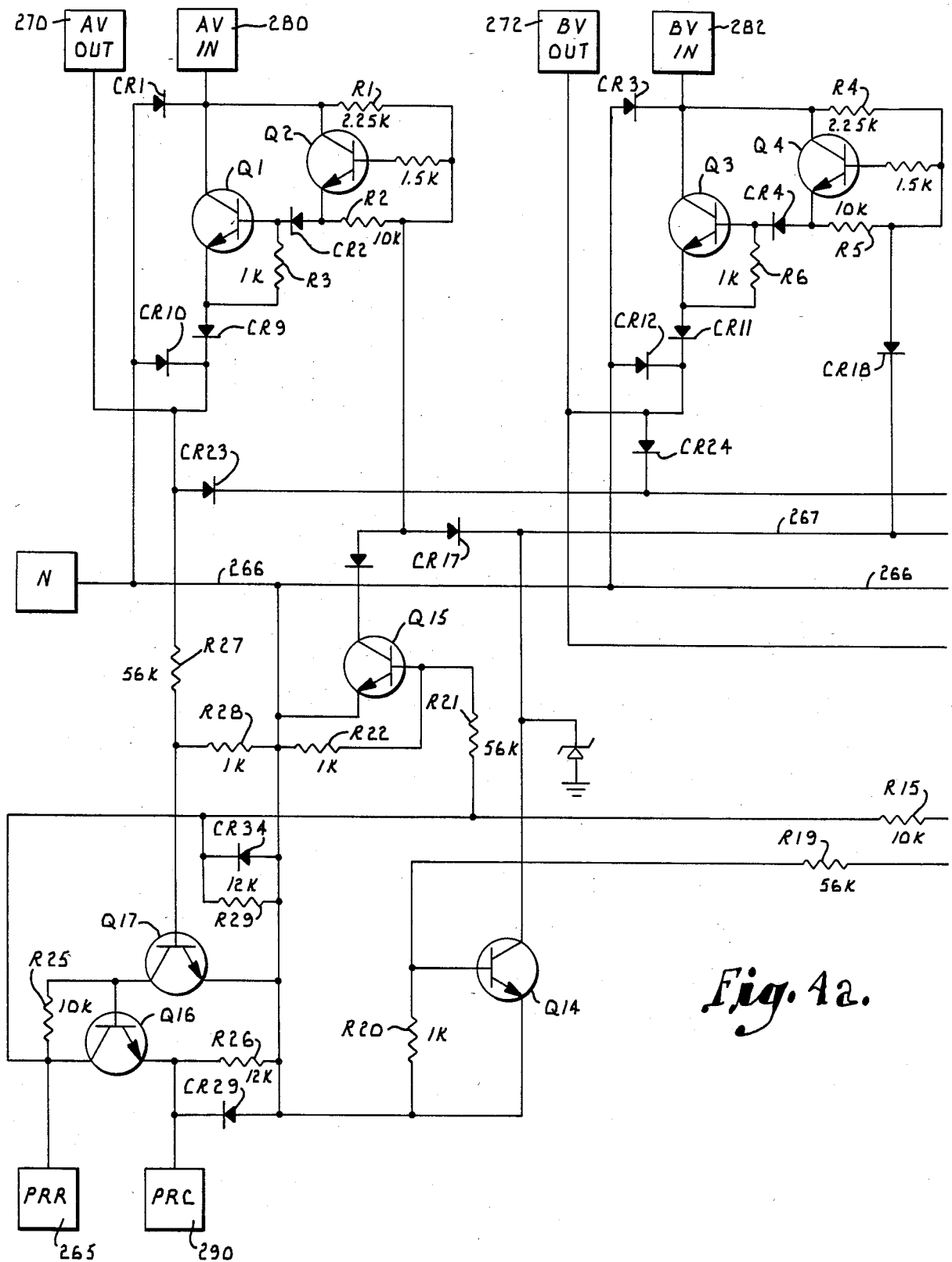

With reference now to FIGS. 4a and 4c, ERD (engine run dropout) and PRR (power reduction) terminals 264 and 265 are connected with the respective terminals 190 and 192 shown in FIG. 2c as outputs from the logic circuitry. The signal applied to terminal 264 is applied to a relay coil 268 and also through resistor R19 to the base of transistor Q14. The emitter of transistor Q14 is connected to a common line 266, and the collector of transistor Q14 connects with conductor 267. When energized, coil 268 closes relay contact 268a and opens contact 268b, the latter of which is included in the dynamic brake circuit of the locomotive.

The A, B, C, and D governor solenoids which determine the throttle setting of the locomotive connect with respective AV out, BV out, CV out and DV out terminals 270, 272, 274 and 276. Power for exciting the respective governor solenoids is applied to the AV in terminal 280, the BV in terminal 282, the CV in terminal 284 and the DV in terminal 286. Terminal 280 connects with the base of transistor Q2 through resistor R1 (1.5K) and with line 267 through resistor R1 and diode CR17. Terminal 282 connects with the base of transistor Q4 through resistor R4 and with line 267 through resistor R4 (1.5K) and diode CR18. Similarly, terminal 284 connects with the base of transistor Q6 through resistor R7 and with line 267 through resistor R7 (1.5K) and diode CR19. The DV in terminal connects with the base of transistor Q8 through resistor R10 (1.5K) and with line 267 through resistor R10, transistor Q11 and diode CR20. The CV in terminal 284 connects with the base of transistor Q11 through resistor R13.

The emitter of transistor Q2 connects through diode CR2 with the base of transistor Q1. The AV in and AV out terminals are connected through transistor Q1 and diode CR9. The BV in and BV out terminals are similarly connected through transistor Q3 and diode CR11. The emitter of transistor Q4 connects through diode CR4 with the base of transistor Q3. Transistor Q5 and diode CR13 connect the CV in and CV out terminals. Diode CR6 connects the emitter of transistor Q6 with the base of transistor Q5. The DV in and DV out terminals 286 and 276 are connected through transistor Q7 and diode CR15. Diode CR8 connects the emitter of transistor Q8 with the base of transistor Q7.

Terminals 270, 272, 274 and 276 are connected through respective diodes CR23, CR24, CR25 and CR26 and through resistor R17 with the base of transistor Q13. The common line 266 connects with the emitter of transistor Q13 and through resistor R24 with its base. The ERD terminal 264 connects through resistor R16 with the collector of transistor Q13 and with the base of another transistor Q12 having its collector tied to terminal 264 and its emitter tied to an ERC terminal 288 which corresponds to the ERC terminal shown in FIG. 2a. The ERC terminal connects through relay contact 268a with the ERC input terminal to the logic circuitry shown in FIG. 2a.

The PRR terminal 265 connects through resistor R21 with the base of transistor Q15 and through resistor R15 with the base of transistor Q10. Transistor Q15 is interposed between resistor R1 and the common line 266. Transistor Q10 connects on its collector side with the BV out terminal 272 and on its emitter side with a diode CR22 which in turn connects with the base of transistor Q9. The collector of transistor Q9 connects with terminal 272, and its emitter connects through diode CR27 with the DV out terminal 276.

Terminal 265 connects with the common line 266 through resistor R25 and a transistor Q17 having its base connected with the AV out terminal 270 through resistor R27. Terminal 265 is connected directly with the collector of transistor Q16 and through resistor R25 with the base of transistor Q16. The emitter of transistor Q16 is tied to a PRC terminal 290 which corresponds to the PRC terminal shown in FIG. 2a.

In the electric circuitry of the locomotive, the D governor solenoid is not energized alone without the C governor solenoid, except to shut down the engine. The locomotive control system has a "stop" position which activates the D solenoid alone to shut off all engines. When there is no CV in signal at terminal 284, transistor Q11 is non-conductive. If at the same time there is a signal at the DV in terminal 286, the non-conductive state of transistor Q11 makes transistors Q8 and Q7 conductive, and the DV in signal is passed through diode CR15 to the DV out terminal 276. Then, the D solenoid is enertgized without accompanying energization of the C solenoid, and all engines are shut off.

A relay coil 300 (FIG. 4b) has one side connected with the common line 266 and its other side connected with a resistor R30. The resistor R30 receives an input signal through diode CR30 from a TNR input 302 which provides a signal to energize coil 300 unless the locomotive is isolated (not developing power). The signal is removed if the locomotive is isolated. However, for the lead locomotive, coil 300 remains energized even if there is isolation, due to a signal which is present at a PS (pressure switch) input 304 and applied to coil 300 through diode CR31. When the pressure switch of the air brake system is closed for the lead unit, there is a signal present at the PS input 304 even if there is no input at 302. Thus, the microprocessor system of the lead unit can communicate with the trail units even if the lead unit is isolated. There is no signal present at input 304 for the trail units, since their pressure switches are open, as indicated previously.

Input 306 is a remote control input used for remote control operation. In the remote control mode, a signal is present at input 306 and is applied to coil 300 through diodes CR32 and CR31 to simulate a signal at input 302. Also, the signal at input 306 is applied to the PS input 304 and from there to the microprocessor so that a locomotive in a remote consist is given a signal indicating that it is a lead unit.

Relay coil 300 controls a pair of TNR relay contacts 308 and 310. In their normally closed positions, the incoming train line input TLI is shorted directly to the outgoing train line output TL0. Then, signals on the train line wires bypass the unit as if it were not present in the consist. When coil 300 is energized, contacts 308 and 310 are connected with an FSI (fuel save in) input and an FSO (fuel save out) terminal, respectively. The FSI and FSO terminals are connected with the microprocessor system to direct the incoming train line signals to the microprocessor and to direct the outgoing signals onto the train line.

Figure 5:
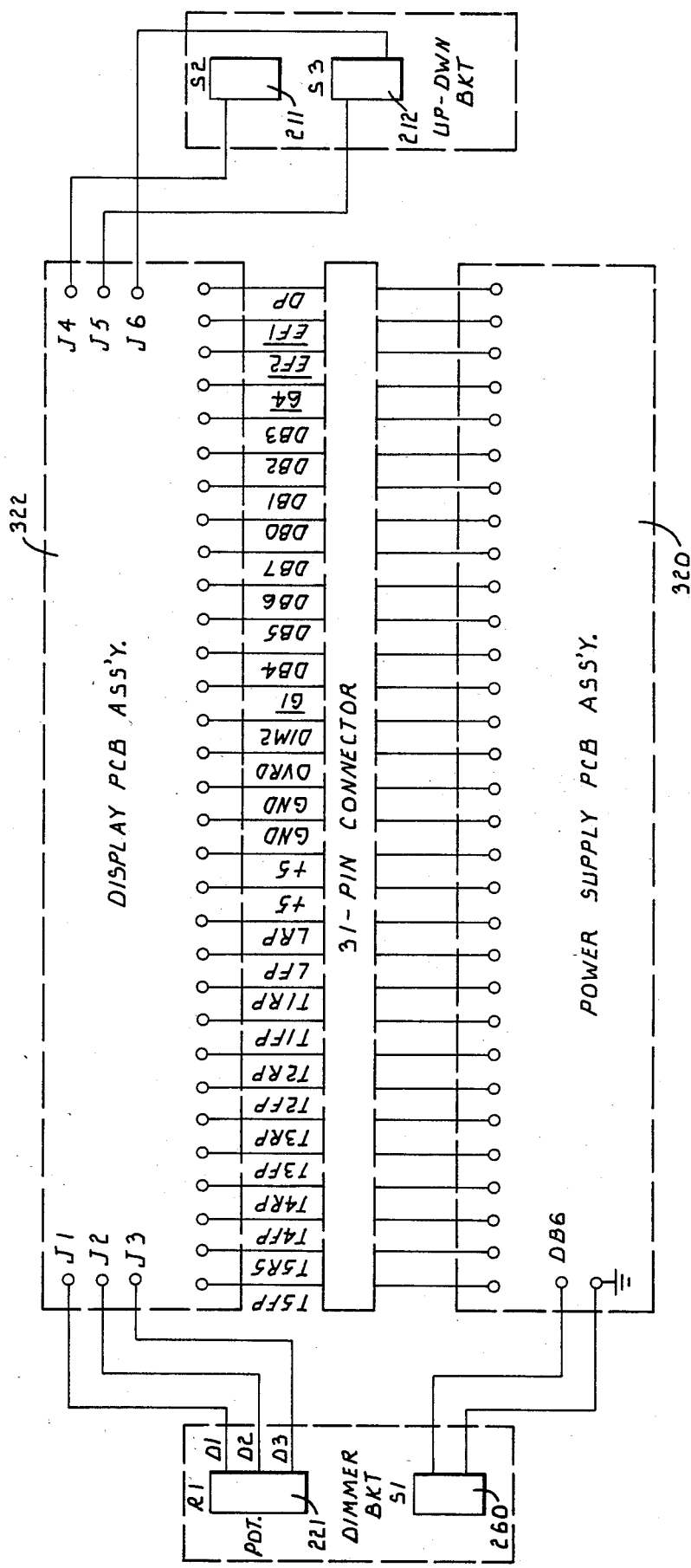
FIG. 5 is a diagrammatic view showing the manner in which the power supply and display boards are interconnected.

FIG. 5 depicts the interconnection between the power supply circuit board 320 and the display circuit board 322. Also shown are the increment and decrement buttons 211 and 212, the power reduction button 260, and the dimmer potentiometer indicated at R1.

Figure 6:
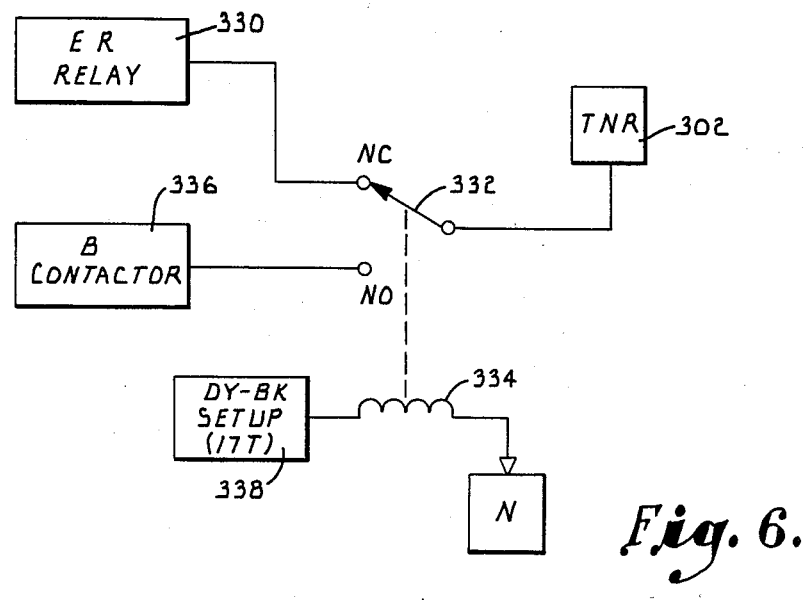
FIG. 6 is a schematic wiring diagram showing various relays and related components of the locomotive circuits dealing with dynamic brake axle limiting.

FIG. 6 illustrates the manner in which the TNR signal is generated. The ER (engine run) relay 330 which is present in the engine control circuit for each locomotive is picked up so long as the locomotive is not isolated or subject to engine failure. The signal developed at the ER relay 330 is normally applied to the TNR terminal 302 through a normally closed relay contact 332 controlled by a relay coil 334. When coil 334 is energized, the contact 332 disconnects terminal 302 from the ER relay 330 and connects it will a B contractor terminal 336. The B contactor terminal is normally active to supply a high signal but is inactive if the dynamic brake for the unit is not set up or not functioning properly, or if an associated safety device is tripped, or if the dynamic brake cut out switch for the unit is on. Coil 334 is controlled by a dynamic brake set up terminal 338 on the No. 17 train line wire which energizes the coil whenever the dynamic brake is set up.

OPERATION

In operation, the control device controls the locomotive system such that it travels at a set speed with minimum fuel consumption. Setting of the desired set speed is accomplished by appropriately manipulating the increment and decrement switches 211 and 212. The set speed is visually displayed on LEDS 217 and 218. Under program control, the microprocessor 10 maintains the locomotive at or near the set speed by selectively placing one or more of the locomotive units at the No. 1 throttle position which is essentially the same as idle engine speed (fuel save two condition) and at most one unit at the No. 5 one half power setting (fuel save one condition). The acceleration and deceleration of the consist are taken into account by the software in determining the power settings of the locomotive units, as are the throttle setting and the condition of the automatic air brake and the dynamic brake.

The control function of the device is performed by the microprocessor 10 which applies pulses to its Q output line 100. The signals on the Q line 100 of the lead locomotive cause 60 volt pulses to be applied to the output line 116 of the signalling circuit in the manner indicated previously. These signals pass through diode 118 and also through diodes CR10 and CR12 to both lines 125 and 126 which transmit the control signal in both directions along the train line wire. The physical position of the lead unit in the locomotive consist may be either at the front or the rear since the signals are transmitted in both directions. Thus, the control function of the device will function as well during backing operations as during normal forward operation.

The first pulse which is emitted by the lead unit along the train line wire initially encounters the first trail unit which is usually immediately behind the lead unit. The 60 volt signal passes into the control device of the first trail unit along one of the train line wire portions 125 or 126 and through diode CR9 or CR8 and resistor R48 to the positive input side of the receiver comparitor 144. It is pointed out that the signal can be received in either direction on train line wire, so the physical location of the trail units in the consist is of no consequence. Transistor Q9 is nonconductive at this time, so it blocks the signal and prevents it from passing through diodes 120 and 121 and back out along lines 125 and 126 to the other trail units.

Since the locomotive is a trail unit, as sensed by the condition of line 66 which connects through buffer 90 and resistor R44 to the negative input side of comparitor 144, an output signal appears on line 156 of the comparitor and is applied to the EF4 flag of the microprocessor. Under program control, the microprocessor of the trail unit responds to the signal by providing a pulse on its Q output line 100, resulting in a 30 volt signal on the signalling circuit output line 116. This signal is applied through diode 118 and then through diodes CR10 and CR12 to both portions 125 and 126 of the train line wire.

The 30 volt signal thus transmitted by the first trail unit is an acknowledgement signal which is delivered to the lead unit. The incoming signal may be transmitted along either line 125 or 126 of the lead unit and through diode CR9 or CR8 to the positive input side of the comparitor 144. The comparitor generates an output on line 156 since there is a reference signal on line 66 corresponding to the status of the locomotive as a lead unit. The acknowledgement signal is applied to the microprocessor of the lead unit on flag EF4 to inform the microprocessor of the presence of the trail unit which transmitted the signal. As previously noted, the application of the 30 volt acknowledgement signal to the comparitor 144 of any of the trail units will not provide an output signal from the comparitor of these trail units due to the condition of the status line 66 of each trail unit.

The acknowledgement signal of each trail unit is used by the lead unit to determine the number of units available for control.

After the microprocessor of the lead unit receives the acknowledgement signal, it may or may not provide to the first trail unit a command to go into the half power condition, depending upon whether or not the locomotive consist can attain the set speed with the first trail unit at half power, and also depending upon the acceleration of the consist. It should be pointed out that the trailing units which are furthest to the rear are preferably reduced in power before those toward the front, so it is contemplated that the first trail unit will be reduced in power only after all of the other trail units are reduced, as will become clear. If full power is needed from the first trail unit, there is no fuel save signal given, and the locomotive consist continues to operate with the first trail unit at full power. However, if the set speed can be achieved with the first trail unit at half power, the microprocessor of the lead unit commands the first trail unit to go into the half power or fuel save one condition at the No. 5 throttle position.

If the fuel save one command is called for, it is given on the Q line 100 of the microprocessor of the lead unit, and a 60 volt signal is applied to line 116 of the signalling circuit as a result. The signal is transmitted through diode 118 and through diodes CR10 and CR12 to the train line wire portions 125 and 126. The signal is received by the first trail unit and is directed through diode CR9 and CR8 to the positive input of the comparitor 144 to provide a signal on line 156 to the EF4 flag of the microprocessor. Under program control, the microprocessor of the trail unit then provides an output signal to buffer 180 from latch circuit 134 under the control of the clock input on line 170c which comes from the decoder 170 (FIG. 2b). The output signal from buffer 180 is applied to the base of transistor Q4 to make it conductive, thus making transistor Q3 conductive. A signal is then applied through diode CR3 to output terminal 192.

The signal which is received by terminal 192 is transmitted to the PRR terminal 265 shown in FIG. 4a. The signal that appears at terminal 265 is applied through resistor R21 to the base of transistor Q15, thus making it conductive. The throttle setting is at the No. 8 position which means that the A, B and C governor solenoids are energized and the D governor solenoid is deenergized. The AV in signal at terminal 280 is normally applied to the base of transistor Q2 and through Q2 to the base of transistor Q1. The AV in signal is thus normally applied through transistor Q1 and diode CR9 to the AV out terminal 270 to excite the A governor valve. However, when transistor Q15 is in the conductive state due to the presence of a signal at terminal 265, a circuit is completed from terminal 280 to the common line 266 to remove the positive bias from the base of transistor Q2. Transistors Q2 and Q1 are then nonconductive and the A governor valve is not excited since terminal 270 is in the low state.

The signal at the BV in terminal 282 maintains transistors Q4 and Q3 conductive and is applied through transistor Q3 and diode CR11 to the BV out terminal 272 in order to energize the B governor solenoid. It is noted that the BV out terminal 272 is also connected with the collector terminals of transistors Q9 and Q10 to apply high signals thereto. The PRR signal at terminal 265 is applied through resistor R15 to the base of transistor Q10 to make transistors Q10 and Q9 conductive. The high signal at the BV out terminal 272 is then applied through transistor Q9 and diode CR27 to the DV out terminal 276. Thus, the D governor solenoid is excited even though there is no input signal present at the DV in terminal 286. Transistors Q6 and Q5 are conductive to direct the high CV in signal at terminal 284 through diode CR13 to the CV out terminal 274.

Thus, the A governor solenoid is deenergized and the B, C and D governor solenoids are all energized. This is the No. 5 throttle setting, and a trail unit which receives a fuel save one signal at its PRR terminal 265 is placed in the half power No. 5 throttle positin.

Confirmation that the trail unit has responded properly to the fuel save one command is provided at the PRC terminal. If the A governor solenoid is deenergized as commanded, the low state of the AV out terminal 270 keeps the base of transistor Q17 low. The high signal at terminal 265 is then applied through transistor Q16 to the PRC terminal 290 and from there to the PRC input (FIG. 2a) which connects with line 25 and with the microprocessor data bus DB6 to inform the microprocessor that the A solenoid valve has been deenergized and that the unit has been dropped to the No. 5 throttle setting.

If the A governor solenoid fails to deenergize when a fuel save one command is given, the base of transistor Q17 is maintained in a high state to pull the base of transistor Q16 low. The PRC signal is then removed and the microprocessor is informed of the failure of the unit to drop to the half power condition in response to the fuel save one signal.

If the first trail unit has gone to half power, it transmits this information to the lead unit by providing a pulse on the Q line 100 of the microprocessor. The Q line pulse effects a 30 volt acknowledgement signal on line 116 which is transmitted in both directions on train line wires 125 and 126. The incoming 30 volt signal is applied to the positive side of comparitor 144 in both lead and adjacent trail units and an output on line 156 is applied to the EF4 flag of the microprocessor to indicate to the lead unit that the first trail unit has gone into the half power fuel save one condition. The adjacent trail unit does not detect the 30 volt signal because the threshold of the trail unit's comparitor 144 is set at 45 volts as previously explained.

If half power operation of the first trail unit is needed to maintain the set speed, there is no full fuel save signal given, and the locomotive consist operates with the first trail unit at half power. However, if the set speed can be attained without power from the first trail unit, a full fuel save signal is provided by the lead unit on the Q line 100 of its microprocessor. This results in 60 volt signal on line 116 which is transmitted on the train line wire to the first trail unit. Under program control, the microprocessor of the first trail unit then effects an output signal from latch circuit 134 to buffer 179. This signal turns on transistor Q2 which results in transistor Q1 being turned on to apply power through diode CR1 to terminal 190.

Terminal 190 connects with the ERD input terminal 264 shown in FIG. 4b. The input signal at terminal 264 is transmitted through resistor R19 to the base of transistor Q14. Transistor Q14 is then conductive and pulls the base of transistor Q2 low through diode CR17, pulls the base of transistor Q4 low through diode CR18, and pulls the base of transistor Q6 low through diode CR19. Transistors Q1, Q3 and Q5 are all nonconductive, and the A, B and C governor solenoids are deenergized. The D governor solenoid is already deenergized, so all of the governor solenoids are deenergized to effect the full fuel save No. 1 throttle condition.

If all of the governor solenoids are deenergized as they should be, the base of transistor Q13 is pulled low. The base of transistor Q12 is held high and coil 268 is energized by the ERD signal, and the ERD signal is applied through transistor Q12 to the ERC terminal and then through the closed contact 268a to the ERC terminal and line 24 (see FIG. 2a) which connects the data bus DB5 of the microprocessor. Thus, the microprocessor receives a signal confirming that all governor solenoids are deenergized to place the unit in full fuel save condition.

If any of the governor solenoids fail to deenergize, the base of transistor Q13 will be held high through one of the diodes CR23, CR24, CR25 or CR26. Then transistor Q13 will be conductive and transistor Q12 will be nonconductive to disconnect terminal 288 from terminal 264. This prevents the transmission of a confirmation signal and informs the microprocessor that there is not a proper response to the full fuel save command.

When the trail unit goes into the full fuel save mode of operation at the No. 1 throttle condition, the microprocessor in the first trail unit receives information on data bus DB5 indicating that the unit is operating in the full fuel save mode. Under program control, the microprocessor of the trail unit applies a signal to its Q line 100 which results in application of a 30 volt acknowledgement signal on the output line 116 of its trail signalling circuit. The acknowledgement signal is transmitted on train line wire to the lead unit and to its comparitor 144. An output on line 156 of the comparitor is applied to the EF4 flag of the lead unit microprocessor to acknowledge that the first trail unit is in the full fuel save mode of operation. This completes the series of pulses between the lead unit and the first trail unit, although the series is repeated during each cycle of operation of the control device. In the timing scheme of the pulses, the ERD (full power reduction) signal is transmitted before the PRR (one half power) signal.

The lead unit microprocessor then applies a pulse to its Q output line 100 which provides an interrogation signal to the next trail unit which is the second trail unit from the lead locomotive. The signal initially reaches the first trail unit from either train line input 125 or 126 and passes through diode CR9 and CR8. However, transfer switch transistor Q9 of the first trail unit is normally not conductive, so the signal which is applied to its emitter will not be conducted to diodes CR10 and CR12, thus breaking the signal path between the lead unit and succeeding trail units.

Turning on of transistor Q9 of the first trail unit is achieved under trail program control after elapse of the time period during which the unit can be directed to go into the fuel save mode of operation. A signal is then provided on the Q4 output line 135 of latch circuit 134 under control of the clock input line 170C which is actuated by the decoder circuit 170 (see FIG. 2b). The signal on line 135 is applied through buffer 136 and resistor R55 to the base of transistor Q8. Transistor Q8 is then conductive to provide a signal to the base of transistor Q9, making the latter transistor conductive such that incoming signals thereafter are transferred in both directions through the circuitry of the first trail unit.

The signal which is transferred through the first trail unit is applied to the second trail unit, and to its receiver comparitor 144 which provides a signal on output line 156 to the EF4 flag of its microprocessor. This interrogation signal is acknowledged by the second unit in the same manner indicated in connection with the first unit, and the lead unit is thus apprised of the presence of the second trail unit in the consist. The lead unit then applies command signals directing the second unit to go into either the half power or No. 1 fuel save condition, or into the full fuel save condition if no output power is needed from the second unit. These command signals and their acknowledgement signals are transmitted in the manner indicated previously in connection with the first trail unit.

After sufficient time has elapsed for the signals to the second trail unit to be given, its transistor Q9 is turned on in the manner indicated previously in connection with the first trail unit, and subsequent signals transfer through the first and second units and go to the third trail unit. Eventually transistor Q9 of the third unit is turned on, and the signals thereafter go from the lead unit to the fourth trail unit. As previously suggested, power reduction of the locomotives is preferably effected from back to front so that the last trail unit is reduced to half power and then to no power, the third trail unit is reduced to half power and then to no power, and so on until no more power reduction can occur without causing the consist to fall short of the set speed. Alternatively, power reductions can occur from front to back.

In the preferred form of the invention, the lead unit does not go to either the half power No. 5 throttle position or to the full fuel save No. 1 throttle position under control of the control device. However, it should be understood that the control device can be arranged to completely control the power of the consist in automatic fashion and without any control being left to the engineer.

The operation of the control device is accurately timed by the crystal controlled microprocessor oscillator and initiated at intervals of one second in cooperation with the timing circuit shown in FIG. 2b. The pulses transmitted on the Q line 100 of each microprocessor are precisely controlled in synchronized fashion to correspond with the operation of the other microprocessors when signals are being transmitted between the locomotive units. The microprocessors thus transmit appropriate signals at the proper times and are in the "listening" or receiving mode at the proper times.

The second trail unit does not detect the first series of pulses which are effectively "swallowed" by the first trail unit, and the 30 volt acknowledgement pulses provided by the first trail unit are too small in amplitude to activate the receiver-comparitor 144 of the second trail unit. The first trail unit responds to only the first set of pulses, and subsequent pulses effectively bypass it. Accordingly, each of the trail units receives only the appropriate series of pulses, and each trail unit responds with an acknowledgement signal that is detected only by the lower comparitor threshold of the lead unit. Other methods of signalling and sequencing the signals may be employed. For example, all pulses may be equal in amplitude and the pulses from the lead unit may all be sent out prior to the lead unit entering the receiving or listening mode. Discrimination between the control pulses and the acknowledgement pulses may be effected in any suitable manner. Media other than the train line wire can be used for transmission of the signals, such as radio for example.

When added power is called for to maintain the set speed of the consist, the first trail unit is initially moved from No. 1 throttle to half power and then to full power, the second trail unit is moved from No. 1 throttle to half power and then to full power, and so forth until there is sufficient overall power to maintain the set speed.

Summarizing the foregoing description of the operation of the control device, the set speed of the locomotive consist is maintained with each unit at either full power, half power or the no power No. 1 throttle position. Since the full power No. 8 throttle position is most efficient, the units are all in either the highly efficient full throttle position or at essentially idle engine speed in the No. 1 throttle position, except that one unit is sometimes operating at half power. Accordingly, the overall operating efficiency of the consist is increased and the fuel consumption is decreased in comparison to the conventional manner of operation wherein there is no variation of the throttle settings of the individual units in incremental steps but rather each locomotive unit is at the same throttle setting which is determined by the throttle setting of the lead unit. Providing each unit with a half power condition in the fuel save mode permits virtually any set speed to be accurately maintained under most circumstances, without significant disadvantages in fuel consumption since at the most only one unit is at half power at any one time. However, it is contemplated that any number of discrete power settings may be provided between the No. 1 and No. 8 throttle settings, and that it may in some situations be desirable to omit the half power setting and have each unit operate either at idle speed or full power.

The actual speed of the locomotive consist is displayed on numeric LEDS 230 and 231. The operation mode of each locomotive is also visually displayed by the LEDS shown in FIG. 3a. For example, when the fourth trail unit is operating at full power in the fuel save mode, the green LED CR5 lights up under the influence of latch circuit 242 and driver circuit 243j to indicate that the fourth trail unit is operating at full power. If the fourth unit is at one half power, the red LED CR11 is lit to indicate the half power condition. When the fourth unit is in the full fuel save condition, both of its LEDS CR5 and CR11 are out. The LEDS for the remaining trail units of the consist are controlled in the same pattern to provide a visual indication of the operating condition of each locomotive. If desired, alternative lighting patterns can be employed to display the operating conditions of the locomotives. If the lead unit commands one of the trail units to go to one half power or no power and the trail unit fails to do so, the trail unit will not transmit to the lead unit an acknowledgement signal confirming proper response. If this occurs for the first trail unit, for example, LEDS CR2 and/or CR8 are caused by the program to blink on and off to indicate a malfunction in connection with the first trail unit.

For the most part, the operation is the same as in the aforementioned Spigarelli et al application, and the software is likewise similar. However, the present invention incorporates some additional features and corresponding changes in the software. An example of softward suitable for proper control of the microprocessor is submitted as an Appendix to the specification.

When the air brakes are applied, the closure of a switch in the air brake system results in the application of +74 volts to the C air brake input terminal 244 (FIG. 1c). The air brake input signal is in turn applied to line 245 and through resistor R46 to Schmidt trigger inverter 246. The output line from the inverter 246 connects between resistor R19 and buffer 247, and the output signal from buffer 247 is applied to the microprocessor (date bus DB5) to inform it that the air brakes have been applied.

Application of the air brakes initiates a predetermined time delay (30–60 seconds) internally of the microprocessor. During the delay period, the system is in the hold mode and maintains the power at the same level as before the air brake is applied. For example, if the motive power for the consist is 2½ locomotive units at the time the air brakes are initially applied, it remains at 2½ units during the delay period. This keeps the consist under power while the air brakes set throughout the train to keep the train slack stretched out. If the air brakes are still applied at the end of the delay period, the microprocessor, under program control, begins to generate command signals which cause a power reduction of ½ unit every 5 seconds.

Thus, the consist cannot be operated under high horsepower for any appreciable time while the air brakes are applied. Significant fuel savings are achieved, and there is significant reduction in the wear on the train wheels, brake shoes and on the track. At the same time, during the delay, horsepower is available to keep the train stretched out while the air brakes become effective. When the air brakes are deactivated, the high signal at terminal 244 is removed, and the consist reverts to normal operation in the fuel save mode. While the air brakes are active, the minimum speed setting feature is negated to permit the speed to drop below the minimum speed setting as power is reduced.

While the air brakes are active, the power reduction button 260 can be depressed to reduce the power more rapidly than occurs otherwise. Depression of button 260 removes the +5 volt signal that is normally applied to the input of buffer 258. This information goes to the data bus DB6 of the microprocessor, and the microprocessor, under program control, begins to issue commands which drop of ½ unit of power per second. The consist power then drops quickly in comparison to the rate of ½ unit every five seconds that normally occurs when the air brakes are applied. The power reduction function is available at all train speeds when air is applied.

As indicated previously, the minimum and maximum speed dip switches 226 and 227 provide a range of speeds that limits the speed setting that can be set by the increment and decrement buttons 211 and 212. If the actual speed of the consist drops below the speed set on the minimum speed switch 226, the consist is gradually taken out of the fuel save mode and gradually reverts to manual control. All units that are reduced in power are brought back on line at the rate of ½ unit every five seconds. Under program control, the microprocessor effects this override of the fuel save mode in a gradual manner and acts quickly enough to avoid any significant problem in train handling. When the actual speed of the consist again rises above the minimum speed setting of switch 226, the microprocessor again takes control in the fuel save mode of operation.

The main purpose of the minimum speed feature is to maintain the throttle setting in the fuel efficient high settings. If the throttle is in the No. 8 setting, the control system will add and reduce power as needed to maintain the speed setting. Throttle setting No. 7 is used to restrict adding power. If the throttle is in the No. 6 setting or below when above minimum speed, the control box will take power away to force the engineer to increase the throttle setting to the more efficient setting in order to maintain speed.

The solid state system shown in FIGS. 4a and 4b controls the governor solenoids of the locomotive engine in a more desirable manner than does the relay system that has been used heretofore. The solid state system can be installed more easily and inexpensively than can a relay system because there is no need for significant wiring to be connected.

When the dynamic brake is applied by placing the throttle control in the idle position and activating the dynamic brake control lever, an input appears at the DY-BK terminal shown in FIG. 2a and is applied to line 42, resistor 42a, inverter 42b and buffer 42c. The buffer output goes to data bus DB4 of the microprocessor to inform it of the application of the dynamic brake. The microprocessor immediately takes all units out of the fuel save mode, and dynamic brake loading begins. Under program control, the microprocessor initiates a time delay of 30 seconds and immediately places the consist in the normal operating mode. If the dynamic brake remains applied for 30 seconds, a 90 second override period is loaded into a counter in the microprocessor. A 90 second override period begins when the dynamic brake is released by movement of the control lever to the "off" position and power is returned. During the override period, manual control is given to the engineer for a period of 90 seconds, after which the consist again begins to operate in the fuel save mode. If the dynamic brake is not applied for a full 30 seconds, no override period is initiated and manual control is not possible.

In this manner, the system is programmed to prevent abuse of the dynamic brake for the purpose only of gaining manual control of the consist. Before the automatic override can be gained, the dynamic brake must be applied for a full 30 seconds to assure that it is used only when there is an actual need for it. During the 90 second override period, the decimal points on the LED displays flash to indicate that the consist is in the override mode. The override period provides sufficient time for the engineer to properly stretch out the consist in a gradual manner from its bunched condition at the end of the dynamic brake mode. Thus, undue shock forces are avoided such as would occur it there were no override period and the consist were to come out of the dynamic brake mode while travelling down a hill. The override period gives manual control to the engineer for sufficient time to avoid any appreciable train handling problems or excessive shock loading. The dynamic brake function has precedence over all other features of the control system. The automatic override has precedence over all power reducing features except the power reduction button 260.

The power reduction button 260 can be depressed to drop the power by ½ unit per second anytime the dynamic brake is deactivated. For example, if the consist is travelling downhill or is in another situation where there is no need for significant power when the dynamic brake is released, the power reduction button can be activated to drop power and save fuel. If the power reduction button 260 is depressed long enough to effect the reduction of ½ unit of power while the consist is in the override mode following release of the dynamic brake, the override period is cancelled and the consist immediately reverts to the fuel save mode of operation.

The setting of the No. 6 and No. 7 dip switches of the minimum speed switch 22 selects the locomotive units which are available for dynamic brake loading, as previously indicated. The coding pattern of the switches is input to the microprocessor which, under program control, provides, when the dynamic brake is applied, a "false" ERD signal to the ERD terminal 264 (FIG. 4b) of each locomotive unit whch is not selected. For example, if the dynamic brake is applied with switch No. 6 closed and switch No. 7 open to select 4 units for dynamic braking, a "false" ERD signal is applied to all units in the consist except for the lead and and first 3 trail units. The "false" ERD signal at terminal 264 of the remaining units activated relay coil 268 which in turn opens relay contact 268b to maintain the dynamic brake circuit open (preventing dynamic brake loading) for all units that are not selected. In this manner, dynamic brake loading is only made available to those locomotives selected in accordance with the setting of the No. 6 and No. 7 dip switches of switch 226 which is inaccessible to crewman and can be set only by authorized personnel. It is also pointed out that the "false" ERD signals have no effect on the throttle circuits which are already idle in the dynamic brake mode.

The circuit shown in FIG. 6 allows units which have malfunctions in their dynamic brake circuits to be bypassed for the purpose of selecting which units are available for dynamic brake loading. In normal operation, the ER relay 330 supplies the TNR terminal 302 which energizes the TNR relay coil 300 (FIG. 4b). If there is an engine failure or a particular unit is isolated, the ER relay is not picked up and the TNR coil 300 is inactive so that the TNR relay contacts 308 and 310 short the train line wire to effectively bypass the disabled or isolated locomotive. When the dynamic brake is applied, relay coil 334 is energized and the TNR terminal 302 is then supplied through relay contact 332 from the B contactor 336. So long as the dynamic brake is set up and there are no safety devices tripped, the B contactor 336 gives the TNR signal which maintains relay coil 300 in the energized condition. However, if there is a malfunction in the dynamic brake circuit, the B contactor 336 goes inactive and the TNR signal is removed. The train line wire is then shorted through the malfunctioning unit, and the microprocessor acts as if it is completely absent from the consist.

For example, if the No. 6 and No. 7 switches of switch 226 are both open to select 4 units in a 6 unit consist, the lead and the first three trail units are normally selected for dynamic brake loading. If the second trail unit has a problem in its dynamic brake circuit, it is simply passed over because the microprocessor does not recognize its presence. Then, the lead, the first trail unit and the third and fourth trail units are made available for dynamic brake loading. The second trail unit is bypassed because of the dynamic brake malfunction, and the fifth trail has its relay contact 268b (FIG. 4b) closed to disable its dynamic brake circuit.

APPENDIX

```
!M
0000 ;              0001
0000 ;              0002    --
0000 ;              0003 ....REV 71 7/6/82   COMBINED FUEL SAVE & TEST
0000 ;              0004 ..FULL HP LEAD..8 MSEC PULSE WIDTH..SOFTWARE C. B.
0000 ;              0005 ..KCS 07/14/80 LEO FMB
0000 ;              0006 ..MOD FOR 6 LOCOS AND PUSH BUTTON SPEED
0000 ;              0007 ....EQUATES....
0000 ;              0008 ORG #0800..32 BYTE RAM ADR
0800 ;              0009  ..THE SEQUENCE OF SOME RAM LOCS IS IMPORTANT
0800 ;              0010 FIFOB:ORG *+17..BOTTOM OF 18-BYTE ACEL FIFO
0811 ;              0011 FIFOT:ORG *+1..FIFO TOP
0812 ;              0012 SPHIB:ORG *+1..HI BYTE OF SPEED
0813 ;              0013 ACEL:ORG *+1..ACCELERATION
0814 ;              0014 VERR:ORG *+1..VELOCITY ERROR
0815 ;              0015 WAITM:ORG *+1..WAIT TIMER FOR DEMAND CHANGES
0816 ;              0016 SCRTCH:ORG *+1    -
0817 ;              0017 SCRT1:ORG *+1
0818 ;              0018 DBTIM:ORG *+1
0819 ;              0019 TPSW:ORG *+1..TEST PROGRAM SWITCH
081A ;              0020 TRSTAT:ORG *+1..TRAIN STATUS (1=FUEL SAVE)
081B ;              0021 TRSTA1:ORG *+1
081C ;              0022 DMSTAT:ORG *+1..DEMAND STATUS (12 BITS)
081D ;              0023 DMSTA1:ORG *+1
081E ;              0024 CARD:ORG *+1..CARD SHIFTED FOR 1/10TH MILES
081F ;              0025 CARD1:ORG *+1
0820 ;              0026 ..REGISTER ASSIGNMENTS
0820 ;              0027 ..R0 MAIN PC
0820 ;              0028 ..R1 INTERR PC
0820 ;              0029 ..R2 EXTRA DATA POINTER & TEMP STORGE
0820 ;              0030 ..R3 USUALLY X
0820 ;              0031 ..R4 EXTRA DATA POINTER
0820 ;              0032 ..R5.0 SET SPEED COUNTER
0820 ;              0033 ..R5.1 TEMP STRG OF SET MPH DIRECTION
0820 ;              0034 ..R6 BINARY SPEED CTR IN 1/10 'S MPH
0820 ;              0035 ..R7 USED AS TEMP STORAGE AND COUNTER
0820 ;              0036 ..R8 USED AS TIME BASE COUNTER & TEMP STRG
0820 ;              0037 ..R9.0 60-SEC O'RIDE TIMER
0820 ;              0038 ..R9.1 O'RIDE STORAGE
0820 ;              0039 ..RA.0 DEMAND COUNTER
0820 ;              0040 ..RA.1 CONTROLS FLASH OF TRAIN STATUS
0820 ;              0041 ..RB IS FAIL COUNTER FOR STUCK TRAIN LINE
0820 ;              0042 ..RC.0 BAD SPEED DELAY CTR
0820 ;              0043 ..RC.1 SPEED SET RATE COUNTER 0=FAST
0820 ;              0044 ..RD SUBROUTINE PC
0820 ;              0045 ..RE.0 DEMAND LEVEL
0820 ;              0046 ..RE.1 AVAILABLE DEMAND
0820 ;              0047 ..RF.0 GENERAL PURP COUNTER
0820 ;              0048 ..RF.1 DECIMAL POINT STATE & CINPRO FLAG
0820 ;              0049 ..
0820 ;              0050  ORG #0000
0000 7100;          0051 START: DIS,#00..X&P=0
0002 C00229;        0052     LBR INT
0005 E06AFE;        0053 HOME: SEX R0; INP 2; SHL..MIN FOR TEST
0008 C3053C;        0054     LBDF PROGM
000B F819A49054;    0055     LDI TPSW; PLO R4; GHI R0; STR R4
0010 69FE;          0056     INP 1; SHL..INPUT FOR TRAIL IS HI LEVEL
0012 E3;            0057     SEX R3
0013 F81AA3A2;      0058     LDI TRSTAT; PLO R3; PLO R2
0017 C3044E;        0059     LBDF TRAIL
```

```
001A 3605;              0060 LEAD1: B3 HOME..WAIT HERE FOR 1 SEC FLAG
001C 9CCEF801;          0061        GHI RC;LSZ;LDI #01..0=FAST
0020 C6F805AF;          0062        LSNZ;LDI #05;PLO RF
0024 6CFA7F5385;        0063 CD: INP 4;ANI #7F;STR R3;GLO R5
0029 F7C7;              0064        SM;LSNF..SET-MAX
002B 03A5;              0065        LDN R3;PLO R5
002D 95CF;              0066 CONTRL: GHI R5;LSDF
002F 3450;              0067    B1 INC
0031 3473;              0068    B1 RESET
0033 3D73;              0069    BN2 RESET
0035 CEFB03;            0070        LSZ;XRI #03
0038 3A73;              0071    BNZ RESET
003A 9DB585CE;          0072        GHI RD;PHI R5;GLO R5;LSZ..GET A 3
003E 25C46AE06C;        0073        DEC R5;NOP;INP 2;SEX R0;INP 4
0043 FA7FE3F5;          0074        ANI #7F;SEX R3;SD
0047 3358;              0075    BPZ SAME..MIN-MAX
0049 85F5C703A5;        0076        GLO R5;SD;LSNF;LDN R3;PLO R5
004E 3058;              0077    BR SAME
0050 CEFB08;            0078 INC: LSZ;XRI #08
0053 3A73;              0079    BNZ RESET
0055 93B515;            0080        GHI R3;PHI R5;INC R5..GET AN 8
0058 2FDD120B;          0081 SAME: DEC RF;SEP RD ,DEL5N ,#0B
005C 851353DDAF;        0082 SAME1: GLO R5;INC R3;STR R3;SEP RD ,RERANG
0061 DD201A9664;        0083        SEP RD ,CNVER1 ,TRSTAT ,BLNK;OUT 4
0066 F81AA38F;          0084        LDI TRSTAT;PLO R3;GLO RF
006A 3A24;              0085    BNZ CD
006C 9CCEFF01BC;        0086        GHI RC;LSZ;SMI #01;PHI RC
0071 307B;              0087    BR CONT
0073 F806BC90AFB5;      0088 RESET: LDI #06;PHI RC;GHI R0;PLO RF;PHI R5
0079 305C;              0089    BR SAME1
007B ;                  0090 ..MEASURE SPEED
007B F816A3;            0091 CONT: LDI SCRTCH;PLO R3
007E ;                  0092 TBCONH=#12..HI TIME BASE BYTE
007E ;                  0093 TBCONL=#98..LOW BYTE
007E ;                  0094 CALFAC=#1E..INCREASE IN TIMEB PER CAL NUMBER
007E 90A6B6;            0095        GHI R0;PLO R6;PHI R6..ZERO COUNTER
0081 F8AAA1F898A7A8;    0096        LDI INTR1;PLO R1;LDI TBCONL;PLO R7;PLO R8
0088 F812B7B86B;        0097        LDI TBCONH;PHI R7;PHI R8;INP 3..DO CALIB ADJ
008D FA0FA2;            0098        ANI #0F;PLO R2..GET CAL NUMBER
0090 329E;              0099 CADJLP: BZ ADJFIN..FINISHED W/ CAL ADJ
0092 87FC1EA7977C00;    0100        GLO R7;ADI CALFAC;PLO R7;GHI R7;ADCI #00
0099 B72282;            0101        PHI R7;DEC R2;GLO R2
009C 3090;              0102    BR CADJLP
009E E0;                0103 ADJFIN: SEX R0
009F 7000;              0104        RET,#00..ENABLE INTR HERE
00A1 98;                0105 FREQLP: GHI R8..8 CYCLE LOOP
00A2 32BD;              0106    BZ EXIT
00A4 28C4C4E0;          0107        DEC R8;NOP;NOP;SEX R0
00A8 30A1;              0108    BR FREQLP
00AA E1;                0109 INTR1: SEX R1..RESET LATCH & RETURN TO FREQLP
00AB 7000;              0110        RET,#00
00AD 87A8;              0111        GLO R7;PLO R8..TIME 0 STARTS HERE AT 2ND INTR
00AF 97B8F8A1A0;        0112        GHI R7;PHI R8;LDI FREQLP;PLO R0
00B4 E1;                0113 RTRN3: SEX R1
00B5 7000;              0114        RET,#00
00B7 28;                0115        DEC R8..3RD THRU N INTERRUPTS START HERE
00B8 16C4E1;            0116        INC R6;NOP;SEX R1
00BB 30B4;              0117    BR RTRN3
00BD 7130;              0118 EXIT: DIS,#30..DISABLE INTERRUPTS
00BF F819A202;          0119        LDI TPSW;PLO R2;LDN R2
00C3 CA0698;            0120        LBNZ EXIT1
00C6 DDEF76;            0121        SEP RD ,SPEED ,BLANK..STR ACEL
00C9 6123;              0122        OUT 1;DEC R3
00CB F815A404CEFF01;    0123 BYPASS: LDI WAITM;PLO R4;LDN R4;LSZ;SMI 1
00D2 5414;              0124        STR R4;INC R4
00D4 89CE29B9;          0125        GLO R9;LSZ;DEC R9;PHI R9..DEC OR & WAITM
00D8 F880A8BF;          0126        LDI #80;PLO R8;PHI RF
00DC 69FA1013;          0127 DB: INP 1;ANI #10;INC R3
```

| | | |
|---|---|---|
| 00E0 3AF4; | 0128 | BNZ DNBOFF |
| 00E2 03CEFF0153; | 0129 | LDN R3;LSZ;SMI #01;STR R3..DB TIMER |
| 00E7 3AEC; | 0130 | BNZ DMEQAV |
| 00E9 F85AA9; | 0131 | LDI 90;PLO R9..AUTO OVERRIDE (90 SEC) |
| 00EC 9EAE; | 0132 | DMEQAV: GHI RE;PLO RE..MAKE DEMAND=AVAIL |
| 00EE F890BF; | 0133 | LDI #90;PHI RF..DP OFF |
| 00F1 C0020F; | 0134 | LBR SETIM1..->SCRTH |
| 00F4 ; | 0135 | .. THR 1=0    THR 2=1 |
| 00F4 ; | 0136 | .. THR 3=4    THR 4=5 |
| 00F4 ; | 0137 | .. THR 5=E    THR 6=F |
| 00F4 ; | 0138 | .. THR 7=6    THR 8=7 |
| 00F4 2338C4; | 0139 | DNBOFF: DEC R3;SKP;NOP |
| 00F7 6BFAC0; | 0140 | INP 3;ANI #C0..OR & PR MEAN SLAVE |
| 00FA C2015D; | 0141 | LBZ FULLT..NO PR,DEC,AB |
| 00FD FE; | 0142 | SHL |
| 00FE CB010C; | 0143 | LBNF ORIDE |
| 0101 FECF91B9; | 0144 | SHL;LSDF;GHI R1;PHI R9..ZERO O.R. |
| 0105 99CEFF01A9; | 0145 | GHI R9;LSZ;SMI #01;PLO R9 |
| 010A 3011; | 0146 | BR OTIMER |
| 010C 91A9, | 0147 | ORIDE: GHI R1;PLO R9..O.R. PUSHED |
| 010E F83DB9; | 0148 | LDI 61,PHI R9 |
| 0111 89, | 0149 | OTIMER. GLO R9 |
| 0112 3229, | 0150 | BZ FORCE |
| 0114 FB01F6, | 0151 | ORT..XRI #01;SHR |
| 0117 301D, | 0152 | BR FSOUT1 |
| 0119 9E538EF7; | 0153 | FSOUT. GHI RE;STR R3;GLO RE,SM..DF=1,DMD=AVAL |
| 011D 93A8F880, | 0154 | FSOUT1. GHI R3;PLO R8, LDI #80..LET INC RE |
| 0121 C7; | 0155 | LSNF..HOLD DP ON TILL ALL UNITS BACK |
| 0122 F890BF; | 0156 | LDI #90;PHI RF..DP OFF |
| 0125 DD05; | 0157 | SEP RD ,WAITIM |
| 0127 30FE; | 0158 | BR INCRD1..BY GIVING ALL DEMAND UNITS BACK |
| 0129 69FA0FFB0FAF; | 0159 | FORCE: INP 1;ANI #0F;XRI #0F;PLO RF |
| 012F F311A343F423; | 0160 | LDI FIFOT;PLO R3;LDA R3;ADD;DEC R3 |
| 0135 C200EC; | 0161 | LBZ DMEQAV |
| 0138 C002A0; | 0162 | MOVING: LBR ABT |
| 013B FFFF; | 0163 | ,#FFFF |
| 013D 43A603B6DDA5; | 0164 | NAB: LDA R3;PLO R6;LDN R3;PHI R6;SEP RD ,INMIN |
| 0143 3319; | 0165 | BDF FSOUT |
| 0145 04FA40; | 0166 | LDN R4;ANI #40 |
| 0148 325B; | 0167 | BZ PWRRED |
| 014A 8FFB06A8; | 0168 | GLO RF;XRI #06;PLO R8..THR 7 |
| 014E 325D; | 0169 | BZ FULLT..0 = DEC PWR NO ADD |
| 0150 FB01; | 0170 | XRI #01 |
| 0152 325D; | 0171 | BZ FULLT |
| 0154 04FA40; | 0172 | AB: LDN R4;ANI #40 |
| 0157 325B; | 0173 | BZ PWRRED |
| 0159 DD05; | 0174 | SEP RD ,WAITIM |
| 015B 30A0; | 0175 | PWRRED: BR DROPD1 |
| 015D 89CE; | 0176 | FULLT: GLO R9;LSZ |
| 015F 3014; | 0177 | BR ORT |
| 0161 DD05; | 0178 | SEP RD ,WAITIM..LOOK AT TIMER |
| 0163 ; | 0179 | ..WAIT IS OVER:OK TO CHANGE DMD |
| 0163 C00505; | 0180 | LBR VERROR |
| 0166 F815A3; | 0181 | LESPWR: LDI WAITM;PLO R3 |
| 0169 02FE; | 0182 | LDN R2;SHL..IS ACEL<0? (B7 WAS=1) |
| 016B 3B8E; | 0183 | BNF DROPDM..NO |
| 016D 04FF03; | 0184 | LDN R4;SMI 3 |
| 0170 338E; | 0185 | BDF DROPDM |
| 0172 02FC14; | 0186 | LDN R2;ADI 20 |
| 0175 3BFE; | 0187 | BNF INCRD1 |
| 0177 04FF02; | 0188 | LDN R4;SMI 2 |
| 017A 338B; | 0189 | BDF TRAIN |
| 017C 02FC0A; | 0190 | LDN R2;ADI 10 |
| 017F 3BEC; | 0191 | BNF INCRDM |
| 0181 04FF01; | 0192 | LDN R4;SMI 1 |
| 0184 338B; | 0193 | BDF TRAIN |
| 0186 02FC03; | 0194 | LDN R2;ADI 3 |
| 0189 3BEC; | 0195 | BNF INCRDM |

```
018B C00215;              0196 TRAIN: LBR TRAINC
018E 04FF02;              0197 DROPDM: LDN R4; SMI 2
0191 33A0;                0198    BDF DROPD1
0193 03FF05;              0199       LDN R3; SMI 5
0196 338B;                0200    BDF TRAIN
0198 04FF01;              0201       LDN R4; SMI 1
019B 33A0;                0202    BDF DROPD1
019D 03;                  0203       LDN R3
019E 3A8B;                0204    BNZ TRAIN
01A0 8E;                  0205 DROPD1: GLO RE.. DROP DEMAND
01A1 328B;                0206    BZ TRAIN..BUT NOT THROUGH 0
01A3 C42E;                0207       NOP; DEC RE
01A5 C006B7;              0208    LBR DTIM
01A8 ;                    0209    ..SPEED=THWL WITHIN 1 MPH
01A8 DD20110202;          0210 WITHN1: SEP RD ,CNVER1 ,FIFOT ,TSUB;LDN R2
01AD 328B;                0211    BZ TRAIN..ACEL=0
01AF 91A8;                0212       GHI R1;PLO R8..NO PWR ADD
01B1 98FA0FFF04FE;        0213       GHI R8;ANI #0F;SMI #04;SHL..1/10 MPH DATA
01B7 3B66;                0214    BNF LESPWR..IN UPPER HALF DIGIT;SLOW DOWN
01B9 F815A302;            0215 MORPWR: LDI WAITM;PLO R3;LDN R2..GET ACEL
01BD 32EC;                0216    BZ INCRDM
01BF FE;                  0217       SHL
01C0 33EC;                0218    BDF INCRDM..ACEL NEG IF DF=1
01C2 04FF04;              0219       LDN R4; SMI 4
01C5 33EC;                0220    BDF INCRDM
01C7 02FF10;              0221       LDN R2; SMI 16
01CA 33A0;                0222    BDF DROPD1
01CC 04FF03;              0223       LDN R4; SMI 3
01CF 338B;                0224    BDF TRAIN
01D1 02FF0C;              0225       LDN R2; SMI 12
01D4 33A0;                0226    BDF DROPD1
01D6 04FF02;              0227       LDN R4; SMI 2
01D9 338B;                0228    BDF TRAIN
01DB 02FF08;              0229       LDN R2; SMI 8
01DE 338E;                0230    BDF DROPDM
01E0 04FF01;              0231       LDN R4; SMI 1
01E3 338B;                0232    BDF TRAIN
01E5 02FF04;              0233       LDN R2; SMI 4
01E8 338E;                0234    BDF DROPDM
01EA 308B;                0235    BR TRAIN
01EC 04FF02;              0236 INCRDM: LDN R4; SMI 2
01EF 33FE;                0237    BDF INCRD1
01F1 03FF04;              0238       LDN R3; SMI 4
01F4 338B;                0239    BDF TRAIN
01F6 04FF01;              0240       LDN R4; SMI 1
01F9 33FE;                0241    BDF INCRD1
01FB 03;                  0242       LDN R3
01FC 3A8B;                0243    BNZ TRAIN
01FE 9E538EF5;            0244 INCRD1: GHI RE;STR R3;GLO RE;SD
0202 CB01A0;              0245    LBNF DROPD1
0205 C206B3;              0246    LBZ FULU
0208 88;                  0247    GLO R8
0209 3215;                0248 ZZZ: BZ TRAINC
020B 1E;                  0249    INC RE
020C C006A8;              0250    LBR UPTIM
020F F815A4;              0251 SETIM1: LDI WAITM;PLO R4
0212 F80A54;              0252    LDI #0A; STR R4..WAIT 10 SECONDS
0215 F816A252;            0253 TRAINC: LDI SCRTCH;PLO R2;STR R2..SWITCH
0219 F31BA38EFF02;        0254    LDI TRSTA1;PLO R3;GLO RE;SMI #02
021F CF1EC4;              0255    LSDF; INC RE; NOP..ALWAYS HAVE 2 DEMANDS
0222 8EAADDE3;            0256    GLO RE;PLO RA;SEP RD ,TNR
0226 C00727;              0257    LBR COMT
0229 ;                    0258
0229 61FF62006390;        0259 INT: OUT 1 ,#FF;OUT 2 ,#00;OUT 3 ,#90..DP OFF
022F ;                    0260    ..CUT THROUGH CLOSED
022F F803ADF803BD;        0261    LDI SUBC;PLO RD;LDI A.1(SUBC);PHI RD
0235 F808B3B4B2;          0262    LDI #08;PHI R3;PHI R4;PHI R2
023A F815A353E4;          0263    LDI WAITM;PLO R3;STR R3;SEX R4
023F F81AA4F88073;        0264    LDI TRSTAT;PLO R4;LDI #80;STXD
```

```
0245 F800A9B9BEB173;  0265        LDI #00;PLO R9;PHI R9;PHI RE;PHI R1;STXD
024C 6AFA7FA5;        0266        INP 2;ANI #7F;PLO R5
0250 F809BBF854AB;    0267        LDI #09;PHI RB;LDI 84;PLO RB..SET FAIL CTR
0256 90AE;            0268        GHI R0;PLO RE..GET A 2
0258 F8FFBC;          0269        LDI #FF;PHI RC
025B E064FF2C9C;      0270 DELUP: SEX R0;OUT 4 ,#FF;DEC RC;GHI RC
0260 3A5B;            0271     BNZ DELUP
0262 AC;              0272        PLO RC
0263 C00005;          0273     LBR HOME
0266 ;                0274
0266 ;                0275 ..TNR INPUT ROUTINE
0266 ;                0276
0266 ;                0277 ..10 PROTOTYPE HAS MOD FOR NEXT 3 BYTES
0266 ;                0278 ..    NOP;LDI #00..C4 F8 00
0266 ;                0279
0266 6BFA10;          0280 TNR1: INP 3;ANI #10
0269 329D;            0281     BZ TSUB2
026B 69FE;            0282        INP 1;SHL..IS IT TRAIL
026D 337D;            0283     BDF TRTNR
026F 9E538AF5;        0284        GHI RE;STR R3;GLO RA;SD..LEAD UNLOADS
0273 CE1A1A8AF5CF;    0285        LSZ;INC RA;INC RA;GLO RA;SD;LSDF
0279 2AC4;            0286        DEC RA;NOP..TRFR PWR BACK TO NEXT UNIT
027B 309D;            0287     BR TSUB2
027D F8DA0F89052;     0288 TRTNR: LDI DEAC;PLO R0;LDI #90;STR R2
0283 309D;            0289     BR TSUB2..FULLPOWER & CLOSE TRNFR
0285 ;                0290
0285 ;                0291 ..LEAD INPUT ROUTINE
0285 ;                0292
0285 69FA20C6;        0293 LEAD1D: INP 1;ANI #20;LSNZ..->TRSTAT1
0289 3095;            0294     BR NOPWR
028B 03FA40C6;        0295        LDN R3;ANI #40;LSNZ
028F 3093;            0296     BR HPWR
0291 93C8;            0297        GHI R3;LSKP..GET AN 8
0293 F804;            0298 HPWR: LDI #04
0295 23;              0299 NOPWR: DEC R3..->TRSTAT
0296 5313;            0300        STR R3;INC R3..->TRSTA1
0298 9173;            0301        GHI R1;STXD
029A F305AF;          0302        LDI 5;PLO RF..INTERROGATE 5 TRAILS
029D C00302;          0303 TSUB2: LBR TSUB
02A0 ;                0304
02A0 E46BFA20E3;      0305 ABT: SEX R4;INP 3;ANI #20;SEX R3
02A5 CA013D;          0306     LBNZ NAB
02A8 04FA40;          0307        LDN R4;ANI #40
02AB C2015B;          0308     LBZ PWRRED
02AE F818A404CE;      0309        LDI DBTIM;PLO R4;LDN R4;LSZ
02B3 FF0154;          0310        SMI #01;STR R4
02B6 CA0215;          0311     LBNZ TRAINC
02B9 DD08;            0312        SEP RD ,WAITI
02BB C0015B;          0313     LBR PWRRED
02BE FFFF;            0314        ,#FFFF
02C0 F318A4F81E54;    0315 WAIT: LDI DBTIM;PLO R4;LDI #1E;STR R4..30 SEC DELAY
02C6 F815A4;          0316 WAITI1:LDI WAITM;PLO R4
02C9 3FCC;            0317     BN4 NSH
02CB 7A;              0318        REQ
02CC 04FF06;          0319 NSH: LDN R4;SMI #06
02CF 3B9D;            0320     BNF TSUB2
02D1 F815A0F802B0;    0321        LDI TRAINC;PLO R0;LDI A.1(TRAINC);PHI R0
02D7 309D;            0322     BR TSUB2
02D9 ;                0323
02D9 ;                0324 ..SUBROUTINE CALL & RETURN
02D9 ;                0325
02D9 ;                0326 PAGE
0300 ;                0327
0300 2F8F;            0328 TSUB1: DEC RF;GLO RF
0302 D0;              0329 TSUB: SEP R0
0303 40AD;            0330 SUBC: LDA R0;PLO RD
0305 ;                0331
0305 ;                0332 ..WAIT TIMER CHECK
```

```
0305 ;                 0333
0305 C002C0;           0334 WAITIM: LBR WAIT
0308 C002C6;           0335 WAITI: LBR WAITI1
030B 3F0E;             0336 SHORTP: BN4 SHRT
030D 7A;               0337        REQ
030E 3002;             0338 SHRT: BR TSUB
0310 FFFF;             0339       ,#FFFF
0312 ;                 0340
0312 ;                 0341
0312 ;                 0342        ..4 MS. X N DELAY SUBROUTINE
0312 ;                 0343
0312 40;               0344 DEL5N: LDA R0..GET N
0313 A7;               0345        PLO R7
0314 87;               0346 DELYLP: GLO R7
0315 3202;             0347        BZ TSUB
0317 F883;             0348        LDI 131
0319 FF01;             0349 SUBAGN: SMI 1
031B 3A19;             0350        BNZ SUBAGN
031D 27;               0351        DEC R7
031E 3014;             0352        BR DELYLP
0320 ;                 0353
0320 ;                 0354        ..BINARY TO BCD CONVERSION
0320 ;                 0355
0320 40A343A6;         0356 CNVER1: LDA R0;PLO R3;LDA R3;PLO R6
0324 03B6;             0357        LDN R3;PHI R6..LOADS M(R3) & M(R3+1) TO R6
0326 91A2;             0358 CNVERT: GHI R1;PLO R2
0328 F817A386;         0359 CNVER: LDI SCRT1;PLO R3;GLO R6
032C FFE8;             0360        SMI #E8..SUBTRACT 1000 FROM SPEED
032E 73967F0353;       0361        STXD;GHI R6;SMBI #03;STR R3
0333 3B3E;             0362        BNF DONEK..IF<1000, DF=0
0335 43B603A6;         0363        LDA R3;PHI R6;LDN R3;PLO R6
0339 F810A2;           0364        LDI #10;PLO R2..R2.0 WAS=0 TILL THIS
033C 3028;             0365        BR CNVER
033E 13;               0366 DONEK: INC R3
033F 86;               0367 MORHI: GLO R6
0340 FF64;             0368        SMI #64..SUBTRACT 100
0342 73967F0053;       0369        STXD;GHI R6;SMBI #00;STR R3
0347 3B50;             0370        BNF DONEHI
0349 12;               0371        INC R2..ADD 1 TO R2.0 FOR EACH 100
034A 43B603A6;         0372        LDA R3;PHI R6;LDN R3;PLO R6
034E 303F;             0373        BR MORHI
0350 13;               0374 DONEHI: INC R3
0351 8653;             0375        GLO R6;STR R3..HEX VALUE IN R6 NOW<#64
0353 FF0A;             0376 MORLO: SMI #0A..SUB 10
0355 3B5F;             0377        BNF CONDON..IF THIS IS <0, CONV IS DONE
0357 53;               0378        STR R3..SAVE NEW DIFFERENCE
0358 86FC06;           0379        GLO R6;ADI #06..ADD 6 TO PACKED BYTE
035B A603;             0380        PLO R6;LDN R3
035D 3053;             0381        BR MORLO
035F 86B8;             0382 CONDON: GLO R6;PHI R8
0361 53;               0383        STR R3..SAVE 1/10 MILE DATA IN R8.1
0362 82B6;             0384        GLO R2;PHI R6
0364 F804A2;           0385        LDI #04;PLO R2..SHIFT OUT 1/10 MPH IN R6
0367 96F6;             0386 SHFAGN: GHI R6;SHR
0369 B68676A62282;     0387        PHI R6;GLO R6;SHRC;PLO R6;DEC R2;GLO R2
036F 3A67;             0388        BNZ SHFAGN
0371 F813A240AD;       0389        LDI ACEL;PLO R2;LDA R0;PLO RD
0376 ;                 0390
0376 ;                 0391        ..STR LEADING ZERO BLANKED DATA FOR OUTPUT
0376 ;                 0392
0376 98FA0FFF04FE;     0393 BLANK: GHI R8;ANI #0F;SMI #04;SHL
037C 3396;             0394        BDF BLNK..ROUND UP DIGIT
037E 86FA0FFB09;       0395        GLO R6;ANI #0F;XRI #09
0383 3A89;             0396        BNZ NO9
0385 86FC06A6;         0397        GLO R6;ADI #06;PLO R6
0389 1686FAF0FBA0;     0398 NO9: INC R6;GLO R6;ANI #F0;XRI #A0
038F 3A96;             0399        BNZ BLNK
```

```
0391 F801B691A6;       0400         LDI #01; PHI R6; GHI R1; PLO R6
0396 96F6;             0401 BLNK:   GHI R6; SHR..SET DF=1 IF>99 MPH
0398 8653FAF0;         0402         GLO R6; STR R3; ANI #F0..MASK LEAST NYBBLE
039C 76;               0403         SHRC..RESULT NOT 0 IF SPEED> 9 MPH
039D 3AA3;             0404         BNZ NOBLNK
039F 86F9F053;         0405         GLO R6; ORI #F0; STR R3..BLANK 10'S DIGIT
03A3 300B;             0406 NOBLNK: BR SHORTP
03A5 ;                 0407
03A5 ;                 0408         ..READ SPEED CARDS AND SUBTRACT R6
03A5 ;                 0409
03A5 F81FA36A;         0410 INMIN:  LDI CARD1; PLO R3; INP 2
03A9 30AF;             0411         BR RERANG
03AB F81FA36C;         0412 INMAX:  LDI.CARD1; PLO R3; INP 4
03AF 03FA7FA7F80A;     0413 RERANG: LDN R3; ANI #7F; PLO R7; LDI #0A
03B5 A191B77353;       0414         PLO R1; GHI R1; PHI R7; STXD; STR R3
03BA 87F453139774;     0415 AG:     GLO R7; ADD; STR R3; INC R3; GHI R7; ADC
03C0 732181;           0416         STXD; DEC R1; GLO R1
03C3 3ABA;             0417         BNZ AG
03C5 86;               0418         GLO R6..CARD - R6
03C6 F5139675;         0419         SD; INC R3; GHI R6; SDB
03CA 3002;             0420         BR TSUB
03CC ;                 0421
03CC ;                 0422         ..TWO BYTE RING SHIFT RIGHT
03CC ;                 0423
03CC 91AB;             0424 RSHIFT: GHI R1; PLO RB..LOOPS TWICE
03CE 03F65313037673;   0425 AGAN:   LDN R3; SHR; STR R3; INC R3; LDN R3; SHRC; STXD
03D5 03C7F98053;       0426         LDN R3; LSNF; ORI #80; STR R3
03DA 8B;               0427         GLO RB
03DB 3A00;             0428         BNZ TSUB1
03DD 1B;               0429         INC RB
03DE 30CE;             0430         BR AGAN
03E0 ;                 0431
03E0 C00285;           0432 LEAD0D: LBR LEAD1D
03E3 C00266;           0433 TNR:    LBR TNR1
03E6 ;                 0434
03E6 E069BCFE;         0435 IN1:    SEX R0; INP 1; PHI RC; SHL
03EA CF91BC;           0436         LSDF; GHI R1; PHI RC
03ED 3002;             0437         BR TSUB
03EF ;                 0438
03EF ;                 0439
03EF 6CFE;             0440 SPEED:  INP 4; SHL..MULTIPLY SPEED BY 3
03F1 CB040D;           0441         LBNF FIFO..MAX SWITCH
03F4 F802AF965313;     0442         LDI #02; PLO RF; GHI R6; STR R3; INC R3
03FA 8653;             0443         GLO R6; STR R3
03FC 86F473967453;     0444 MULT:   GLO R6; ADD; STXD; GHI R6; ADC; STR R3
0402 132F8F;           0445         INC R3; DEC RF; GLO RF
0405 CA03FC;           0446         LBNZ MULT
0408 03A62303B6;       0447         LDN R3; PLO R6; DEC R3; LDN R3; PHI R6
040D E2;               0448 FIFO:   SEX R2
040E F811A286F75312;   0449         LDI FIFOT; PLO R2; GLO R6; SM; STR R3; INC R2
0415 139677E3;         0450         INC R3; GHI R6; SMB; SEX R3
0419 CB042F;           0451         LBNF FIFOC..NEW-OLD
041C 7343FF06032F00;   0452         STXD; LDA R3; SMI #06; LDN R3; SMBI #00
0423 3B2F;             0453         BL FIFOC..DIF-2
0425 8C;               0454         GLO RC
0426 322F;             0455         BZ FIFOC
0428 2C;               0456         DEC RC
0429 F8CBA0;           0457         LDI BYPASS; PLO R0
042C C00302;           0458         LBR TSUB
042F ;                 0459         ..FIFO CODE
042F F805AC;           0460 FIFOC:  LDI #05; PLO RC..BAD SPEED DELAY CTR
0432 F800A2A312;       0461         LDI FIFOB; PLO R2; PLO R3; INC R2
0437 F811AF;           0462         LDI 17;; PLO RF..GET AN 17
043A 4253132F8F;       0463 FIFLP:  LDA R2; STR R3; INC R3; DEC RF; GLO RF
043F 3A3A;             0464         BNZ FIFLP..MAKE 17 MOVES(TILL RF.0=0)
0441 86;               0465         GLO R6..GET LOW BYTE OF SPEED
0442 53;               0466         STR R3..STORE LAST SPEED AT TOP OF FIFO
0443 96;               0467         GHI R6..STR HI BYTE NEXT TO LO IN FIFO
0444 521291A386;       0468         STR R2; INC R2; GHI R1; PLO R3; GLO R6..->FIFOB
```

```
0449 F752;              0469        SM; STR R2
044B C00326;            0470        LBR CNVERT
044E ;                  0471
044E ;                  0472
044E ;                  0473
044E 7A03F91073;        0474 TRAIL: REQ;LDN R3;ORI #10;STXD..BLANK DP
0453 91BA73F8FF7353;    0475        GHI R1;PHI RA;STXD;LDI #FF;STXD;STR R3
045A 64616263;          0476        OUT 4;OUT 1;OUT 2;OUT 3...->R3=TRSAT1 R2=TRSTAT
045E DDE3;              0477        SEP RD ,TNR
0460 F80CAF02FE;        0478        LDI #0C;PLO RF;LDN R2;SHL
0465 3BA4;              0479 MARK: BNF TFROPN
0467 9E;                0480        GHI RE..IS COMM IN PROG?
0468 3A8B;              0481        BNZ CINPRO
046A 377E;              0482 COMLT1: B4 CHECK..COMM LINE TEST
046C 9BF6CF;            0483        GHI RB;SHR;LSDF..TRAINLINE HIGH FAILURE
046F 3676;              0484        B3 COUNT
0471 C7;                0485        LSNF
0472 3E76;              0486        BN3 COUNT
0474 30FF;              0487        BR FSVOUT
0476 9B;                0488 COUNT: GHI RB
0477 32B1;              0489        BZ START1
0479 FF01BB;            0490        SMI #01;PHI RB
047C 30FF;              0491        BR FSVOUT
047E DD1201;            0492 CHECK: SEP RD ,DEL5N ,#01..SEE IF ZERO FOR 12 DELAY
0481 2F8F;              0493        DEC RF;GLO RF
0483 3A6A;              0494        BNZ COMLT1
0485 02FA70;            0495        LDN R2;ANI B'01110000'..OPEN TFR (B7=0)
0488 52;                0496        STR R2
0489 30FF;              0497        BR FSVOUT
048B BF;                0498 CINPRO: PHI RF..COMN IN PROG:USE RF.1 AS FLAG
048C DD1201;            0499 MORDLY: SEP RD ,DEL5N ,#01
048F 3F93;              0500        BN4 LEAVE1..SEE IF LINE=1 FOR 12 DELAYS (60 MS)
0491 91BF;              0501        GHI R1;PHI RF..CLR FLAG IF LINE EVER=0
0493 2F8F;              0502 LEAVE1: DEC RF;GLO RF
0495 3A8C;              0503        BNZ MORDLY
0497 9F;                0504        GHI RF
0498 32B0;              0505        BZ DCFAIL..COUNT TOWARD FAILSAFE
049A 91;                0506        GHI R1..COMN OVER
049B BE;                0507        PHI RE..CLR COM IN PROG FLG
049C F809BBF854AB;      0508        LDI #09;PHI RB;LDI 84;PLO RB..SET FAIL CTR
04A2 30FF;              0509        BR FSVOUT
04A4 F857;              0510 TFROPN: LDI 87..WAIT HERE FOR A ONE
04A6 3FB8;              0511 WATLP1: BN4 FSTONE
04A8 FF01;              0512        SMI 1
04AA 3AA6;              0513        BNZ WATLP1
04AC 2F8F;              0514        DEC RF;GLO RF
04AE 3AA4;              0515        BNZ TFROPN
04B0 8B;                0516 DCFAIL: GLO RB..TRAIN LINE LOW FAILURE
04B1 E0;                0517 START1: SEX R0
04B2 C20000;            0518        LBZ START
04B5 2B;                0519        DEC RB
04B6 30FF;              0520        BR FSVOUT
04B8 F857;              0521 FSTONE: LDI 87..TRAIL LINE GOES TO ONE
04BA 37B0;              0522 WATLP2: B4 DCFAIL..MUST BE > 5 MS TO BE VALID
04BC FF01;              0523        SMI 1
04BE 3ABA;              0524        BNZ WATLP2
04C0 DD12017B;          0525        SEP RD ,DEL5N ,#01;SEQ
04C4 DD12027A;          0526        SEP RD ,DEL5N ,#02;REQ..IN SVC ACK
04C8 DD1201;            0527        SEP RD ,DEL5N ,#01..SAMPLE CENTER
04CB F890;              0528        LDI B'10010000'..MAKE TRF & DP OFF
04CD 37D1;              0529        B4 SKPFS1..LEAVE FUEL SAVE1 (B5)=0
04CF F920;              0530        ORI B'00100000'..ERD RELAY DRIVE
04D1 52DD1201;          0531 SKPFS1: STR R2;SEP RD ,DEL5N ,#01
04D5 69;                0532        INP 1..GET STAT 1&2 INTO SCRTCH+1 &D
04D6 FA20;              0533        ANI B'00100000'..STAT1 IS COMPLEMNT OF BIT 5
04D8 C67BC4;            0534        LSNZ;SEQ;NOP
04DB DD1202;            0535        SEP RD ,DEL5N ,#02..STAT1 ACK
04DE 7ADD1201;          0536        REQ;SEP RD ,DEL5N ,#01..SAMPLE NEXT CENTER
04E2 02;                0537        LDN R2
```

```
04E3 37E7;            0538        B4 SKPFS2
04E5 F940;            0539           ORI B'01000000'..PRR RELAY DRIVE
04E7 52BE;            0540 SKPFS2: STR R2; PHI RE..SET COM IN PROG FLG
04E9 FBF0;            0541           XRI #F0..SEE IF BOTH RELAY WON'T TO ACTIVATE
04EB 3AF0;            0542           BNZ SKPDBR
04ED F88052;          0543           LDI #80; STR R2..DEACTIVATE BOTH RELAYS
04F0 DD120103;        0544 SKPDBR: SEP RD ,DEL5N ,#01; LDN R3..STAT2 IS BIT 6
04F4 FA40C67BC4;      0545           ANI B'01000000'; LSNZ; SEQ; NOP
04F9 DD12027A;        0546           SEP RD ,DEL5N ,#02; REQ..SEND STAT2 ACK
04FD E263;            0547 DEAC: SEX R2; OUT 3..CLOSE TRANSFER AND DP OFF
04FF E06AA5;          0548 FSVOUT: SEX R0; INP 2; PLO R5
0502 C00005;          0549 HOME1: LBR HOME
0505 ;                0550
0505 F814A4;          0551 VERROR: LDI VERR; PLO R4
0508 F817A38553;      0552        LDI SCRT1; PLO R3; GLO R5; STR R3
050D DDAF2343A603;    0553        SEP RD ,RERANG; DEC R3; LDA R3; PLO R6; LDN R3
0513 B6F811A386F7;    0554        PHI R6; LDI FIFOT; PLO R3; GLO R6; SM
0519 A696137786;      0555        PLO R6; GHI R6; INC R3; SMB; PHI R6

051E CB052C;          0556        LBNF CHANGE
0521 DD26028654;      0557        SEP RD ,CNVERT ,TSUB; GLO R6; STR R4
0526 C201A8;          0558        LBZ WITHN1
0529 C001B9;          0559        LBR MORPWR
052C 86FD00A6967D00;  0560 CHANGE: GLO R6; SDI #00; PLO R6; GHI R6; SDBI #00
0533 B6DD26028654;    0561        PHI R6; SEP RD ,CNVERT ,TSUB; GLO R6; STR R4
0539 C00166;          0562        LBR LESPWR
053C ;                0563
053C DDE6;            0564 PROGM: SEP RD ,IN1
053E 363E;            0565        B3 *
0540 3C49;            0566        BN1 FSRET
0542 F819A353;        0567        LDI TPSW; PLO R3; STR R3..NOT ZERO
0546 C00583;          0568        LBR KCSTST
0549 F890BFE3DDA5;    0569 FSRET: LDI #90; PHI RF; SEX R3; SEP RD ,INMIN
054F DD201E9661;      0570        SEP RD ,CNVER1 ,CARD ,BLNK; OUT 1..MIN ON MPH
0554 DDABDD201E9664;  0571        SEP RD, INMAX; SEP RD ,CNVER1 ,CARD ,BLNK; OUT 4
055B DD127DE061FF;    0572        SEP RD ,DEL5N ,#7D; SEX R0; OUT 1 ,#FF
0561 64FF9EAEE3;      0573        OUT 4 ,#FF; GHI RE; PLO RE; SEX R3
0566 F819A391539C;    0574        LDI TPSW; PLO R3; GHI R1; STR R3; GHI RC
056C C20215;          0575        LBZ TRAINC..0=LEAD
056F 7A;              0576        REQ
0570 F81DA3F3027391;  0577        LDI DMSTA1; PLO R3; LDI #02; STXD; GHI R1
0577 73DDE0;          0578        STXD; SEP RD ,LEADOD
057A DDCC;            0579 RING: SEP RD ,RSHIFT
057C 3A7A;            0580        BNZ RING
057E 1313;            0581        INC R3; INC R3..->DMSTAT
0580 C007C0;          0582        LBR EQDRIV
0583 ;                0583
0583 ;                0584 ..      INROM TEST PROGRAM FOR KCS
0583 ;                0585
0583 61FF62006390;    0586 KCSTST: OUT 1 ,#FF; OUT 2 ,#00; OUT 3 ,#90
0589 F811A491AC54BA;  0587        LDI FIFOT; PLO R4; GHI R1; PLO RC; STR R4; PHI RA
0590 3E90;            0588 KEEPC: BN3 *
0592 E46424;          0589        SEX R4; OUT 4; DEC R4
0595 90AF7A;          0590        GHI R0; PLO RF; REQ..R0=05XX
0598 F802BEDD12109C;  0591        LDI #02; PHI RE; SEP RD ,DEL5N ,#10; GHI RC
059F 3ABA;            0592        BNZ TRYAG..LEAD/TRAIL SW   TRAIL NOT ZERO
05A1 7BDD12027A;      0593 NXT: SEQ; SEP RD ,DEL5N ,#02; REQ
05A6 DD1201;          0594        SEP RD ,DEL5N ,#01
05A9 37B2;            0595        B4 NOUNIT
05AB 9EFC02BE;        0596        GHI RE; ADI #02; PHI RE
05AF E3DDA5;          0597        SEX R3; SEP RD ,INMIN..USED AS DELAY ONLY
05B2 DD12092F8F;      0598 NOUNIT: SEP RD ,DEL5N ,#09; DEC RF; GLO RF
05B7 3AA1;            0599        BNZ NXT
05B9 7B;              0600        SEQ
05BA 9EAE;            0601 TRYAG: GHI RE; PLO RE
05BC F800A1A3E4;      0602 TRYAGN: LDI FIFOB; PLO R1; PLO R3; SEX R4
05C1 6424;            0603        OUT 4; DEC R4
05C3 3EC9;            0604        BN3 SKPT
05C5 91A9;            0605        GHI R1; PLO R9..ZERO
```

```
05C7 30BC;              0606        BR TRYAGN
05C9 89;                0607 SKPT: GLO R9
05CA 3ABC;              0608        BNZ TRYAGN
05CC 19;                0609        INC R9
05CD 3CE3;              0610 SKPT1: BN1 XCUTE..UP> INC PRGM SELECTOR
05CF 04FC0154FF08C7;    0611        LDN R4; ADI #01; STR R4; SMI #08; LSNF
05D6 91546424;          0612        GHI R1; STR R4; OUT 4; DEC R4
05DA E061FF62006390;    0613        SEX R0; OUT 1 ,#FF; OUT 2 ,#00; OUT 3 ,#90
05E1 3090;              0614        BR KEEPC..PGR SELECTOR MUST BE 0 TO GET FSRET
05E3 C00600;            0615 XCUTE: LBR XCUTE1
05E6 ;                  0616
05E6 ;                  0617 PAGE
0600 ;                  0618
0600 90B7F80BF4;        0619 XCUTE1: GHI R0; PHI R7; LDI TABLE; ADD
0605 A7DDE6E307A0;      0620        PLO R7; SEP RD ,IN1; SEX R3; LDN R7; PLO R0
060B ;                  0621
060B 13196B35;          0622 TABLE: ,FSRET1 ,DISPLY ,SPED ,INP1
060F 3A16674B;          0623        ,INP3 ,COMUN1 ,VDROP ,COMP
0613 ;                  0624
0613 C00549;            0625 FSRET1: LBR FSRET
0616 C00700;            0626 COMUN1: LBR COMUN
0619 ;                  0627
0619 E061886488;        0628 DISPLY: SEX R0; OUT 1 ,#88; OUT 4 ,#88
061E DD12509AFB01BA;    0629        SEP RD ,DELSN ,#50; GHI RA; XRI #01; PHI RA
0625 F6;                0630        SHR
0626 3B2F;              0631        BNF ARD
0628 63956255;          0632        OUT 3 ,#95; OUT 2 ,#55
062C C00590;            0633 PC: LBR KEEPC    ..TRNSFR CLOSED
062F 638A62AA;          0634 ARD: OUT 3 ,#8A; OUT 2 ,#AA
0633 302C;              0635        BR PC
0635 ;                  0636
0635 69FBFF;            0637 INP1: INP 1; XRI #FF
0638 303D;              0638        BR IN
063A ;                  0639
063A 6BFBF0;            0640 INP3: INP 3; XRI #F0
063D 5362;              0641 IN: STR R3; OUT 2
063F E061FF;            0642        SEX R0; OUT 1, #FF
0642 3D47;              0643        BN2 ARD1
0644 6310C8;            0644        OUT 3 ,#10; LSKP..TRNSFR OPEN DP OFF
0647 6380;              0645 ARD1: OUT 3 ,#80..TRNSFR CLOSED DP ON
0649 302C;              0646        BR PC
064B ;                  0647
064B 7AE46424E0;        0648 COMP: REQ; SEX R4; OUT 4; DEC R4; SEX R0
0650 3F5A;              0649        BN4 BACK
0652 61FF6200;          0650        OUT 1, #FF; OUT 2 ,#00
0656 6390;              0651        OUT 3 ,#90
0659 3760;              0652        B4 COMP2
065A 618862556385;      0653 BACK: OUT 1 ,#88; OUT 2 ,#55; OUT 3 ,#85
0660 3566;              0654 COMP2: B2 IDL
0662 E4;                0655        SEX R4
0663 C005CD;            0656        LBR SKPT1
0666 00;                0657 IDL: IDL
0667 ;                  0658
0667 7B;                0659 VDROP: SEQ
0668 C005BC;            0660        LBR TRYAGN
066B ;                  0661
066B ;                  0662
066B ;                  0663 ..MEASURE SPEED
066B F816A3;            0664 SPED: LDI SCRTCH; PLO R3
066E 6CFE;              0665        INP 4; SHL..MAX FOR 20 PPR
0670 CB007B;            0666        LBNF CONT
0673 E46424E3;          0667        SEX R4; OUT 4; DEC R4; SEX R3..TWEEK W.D.
0677 ;                  0668 TBCOH=#35..HI TIME BASE BYTE
0677 ;                  0669 TBCOL=#E8..LOW BYTE
0677 ;                  0670 CALFC=#5A..INCREASE IN TIMEB PER CAL NUMBER
0677 91A6B6;            0671        GHI R1; PLO R6; PHI R6..ZERO COUNTER
067A F8AAA1F8E8A7A8;    0672        LDI INTR1; PLO R1; LDI TBCOL; PLO R7; PLO R8
0681 F835B7B86B;        0673        LDI TBCOH; PHI R7; PHI R8; INP 3..DO CALIB ADJ
```

```
0686 FA0FA2;          0674       ANI #0F;PLO R2..GET CAL NUMBER
0689 C2009E;          0675 CADJP: LBZ ADJFIN..FINISHED W/ CAL ADJ
068C 87FC5AA7977C00;  0676       GLO R7;ADI CALFC;PLO R7;GHI R7;ADCI #00
0693 B72282;          0677       PHI R7;DEC R2;GLO R2
0696 3089;            0678       BR CADJP
0698 DD2696;          0679 EXIT1: SEP RD ,CNVERT ,BLNK
069B 3D9F;            0680       BN2 NOBLK1
069D 9853;            0681       GHI R8;STR R3
069F 61;              0682 NOBLK1: OUT 1..DISPLAY SPEED
06A0 E46424;          0683       SEX R4;OUT 4;DEC R4..TWEEK W.D.
06A3 36A3;            0684       B3 *
06A5 C00590;          0685       LBR KEEPC
06A8 ;                0686
06A8 ;                0687
06A8 89;              0688 UPTIM: GLO R9..OVERRIDE
06A9 3AB3;            0689       BNZ FULU
06AB 04FF02;          0690       LDN R4;SMI #02
06AE 33B3;            0691       BDF FULU
06B0 F80DC8;          0692       LDI #0D;LSKP
06B3 F80A;            0693 FULU: LDI #0A..- ACCEL
06B5 30C4;            0694       BR STORE
06B7 DD20110286FF45;  0695 DTIM: SEP RD ,CNVER1 ,FIFOT ,TSUB;GLO R6;SMI #45
06BE CFF80AC7;        0696       LSDF;LDI #0A;LSNF..LOW SPEED
06C2 F808;            0697       LDI #08..HIGH SPEED
06C4 5391BAF815A4;    0698 STORE: STR R3;GHI R1;PHI RA;LDI WAITM;PLO R4
06CA 0354;            0699       LDN R3;STR R4
06CC C00215;          0700       LBR TRAINC
06CF ;                0701
06CF ;                0702
06CF ;                0703 PAGE
0700 ;                0704
0700 3E00;            0705 COMUN: BN3 *
0702 F816A29152;      0706       LDI SCRTCH;PLO R2;GHI R1;STR R2..SWITCH
0707 8CCE;            0707       GLO RC;LSZ
0709 3012;            0708 CNT2: BR CONT2
070B 3D09;            0709       BN2 CNT2
070D BA1EF803AC;      0710       PHI RA;INC RE;LDI #03;PLO RC
0712 F81BA39E538E;    0711 CONT2: LDI TRSTA1;PLO R3;GHI RE;STR R3;GLO RE
0718 F5CF91AE8AA;     0712       SD;LSDF;GHI R1;PLO RE;GLO RE;PLO RA
071E F3CE91C8F810;    0713       XOR;LSZ;GHI R1;LSKP;LDI #10
0724 F980BF;          0714       ORI #80;PHI RF..TNFR CLOSED
0727 F802BE8A;        0715 COMT: LDI #02;PHI RE;GLO RA
072B 3A33;            0716       BNZ PRTEST
072D 9FF920BF;        0717       GHI RF;ORI #20;PHI RF
0731 303D;            0718       BR LEAD02
0733 F62A;            0719 PRTEST: SHR;DEC RA
0735 3A3C;            0720       BNZ LEAD
0737 9FF940BF38;      0721       GHI RF;ORI #40;PHI RF;SKP
073C 2A;              0722 LEAD: DEC RA
073D DDE0;            0723 LEAD02: SEP RD ,LEAD0D
073F 7A;              0724       REQ..OPEN ALL TFR SWS
0740 DD120D;          0725       SEP RD ,DEL5N ,#0D..THIRTEEN TIMES
0743 02;              0726 XTUNT: LDN R2
0744 3A49;            0727       BNZ SETQ
0746 9C;              0728       GHI RC
0747 3A96;            0729       BNZ TRAL..ACTIVATE RELAYS ONLY IN TRAIL
0749 7BDD1202;        0730 SETQ: SEQ;SEP RD ,DEL5N ,#02
074D 7A;              0731       REQ
074E DD1201;          0732       SEP RD ,DEL5N ,#01
0751 3F58;            0733       BN4 INSER..IS UNIT IN SERVICE?
0753 DD1209;          0734       SEP RD ,DEL5N ,#09..NO
0756 3090;            0735       BR UINS04
0758 DD1201;          0736 INSER: SEP RD, DEL5N ,#01..YES
075B 9EFC02BE;        0737       GHI RE;ADI 2;PHI RE..ADD 2 UN. OF AVAIL DEMAND
075F 8AC6C47B;        0738       GLO RA;LSNZ;NOP;SEQ..SHIFT IN A 1 IF ERD COMING
0763 DD12027A;        0739       SEP RD ,DEL5N ,#02;REQ
0767 DD120103;        0740       SEP RD ,DEL5N ,#01;LDN R3..-.>TRSTAT
076B 3F6F;            0741       BN4 ERD1..DB0&DB1 ALREADY ZERO
```

```
076D F930;                0742        ORI #30. . MUST BE FPWR OR PRR
076F 53DD12013A;          0743 ERD1: STR R3; SEP RD ,DEL5N ,#01; GLO RA
0774 327D;                0744        BZ NMORE
0776 FB012ACE;            0745        XRI #01; DEC RA; LSZ. . ZERO MEANS PRR
077A 2A387B;              0746        DEC RA; SKP; SEQ
077D DD1202;              0747 NMORE: SEP RD ,DEL5N ,#02
0780 7ADD120103;          0748        REQ; SEP RD ,DEL5N ,#01; LDN R3
0785 373A;                0749        B4 N01
0787 FA1FC8;              0750        ANI #1F; LSKP. . PRRR
078A FA2F53DD1201;        0751 N01:  ANI #2F; STR R3; SEP RD ,DEL5N ,#01. . NO RETURN
0790 DDCC;                0752 UINS04: SEP RD ,RSHIFT
0792 3A43;                0753        BNZ XTUNT
0794 7BC8;                0754        SEQ; LSKP. . DONE TRANSMIT AND RECIEVE
0796 DDCC;                0755 TRAL:  SEP RD ,RSHIFT
0798 3A43;                0756        BNZ XTUNT
079A F81DA38EAA;          0757 TRARD: LDI DMSTA1; PLO R3; GLO RE; PLO RA
079F 02CEDDE3;            0758        LDN R2; LSZ; SEP RD ,TNR
07A3 F806AF;              0759        LDI #06; PLO RF
07A6 917353;              0760        GHI R1; STXD; STR R3
07A9 8A;                  0761 OUTST2: GLO RA
07AA 32BC;                0762        BZ NON
07AC FF02AA;              0763        SMI #02; PLO RA
07AF 3BB6;                0764        BL PRDMD1
07B1 03F920;              0765        LDN R3; ORI #20
07B4 30BB;                0766        BR ENTDM1
07B6 91AA;                0767 PRDMD1: GHI R1; PLO RA. . ZERO A
07B8 03F910;              0768        LDN R3; ORI #10 .
07BB 53;                  0769 ENTDM1: STR R3
07BC DDCC;                0770 NON: SEP RD ,RSHIFT
07BE 3AA9;                0771        BNZ OUTST2
07C0 9FF173FAF023;        0772 EQDRIV: GHI RF; OR; STXD; ANI #F0; DEC R3;
07C6 F1539AFB01BA;        0773        OR; STR R3; GHI RA; XRI #01; PHI RA. . ->TRSTAT
07CC F6C71313;            0774        SHR; LSNF; INC R3; INC R3
07D0 F819A202;            0775        LDI TPSW; PLO R2; LDN R2
07D4 3AE2;                0776        BNZ OUTS
07D6 ;                    0777
07D6 ;                    0778 ..10 PROTOTYPE HAS MOD FOR NEXT 5 BYTES
07D6 ;                    0779 ..    SEX R0; NOP; LDI #00; SEX R3. . E0 C4 F8 E3
07D6 ;                    0780
07D6 E06BFA10E3;          0781        SEX R0; INP 3; ANI #10; SEX R3
07DB 32E2;                0782        BZ OUTS
07DD 1303FAFD73;          0783        INC R3; LDN R3; ANI #FD; STXD. . BLK FULL DISPLAY
07E2 6362;                0784 OUTS: OUT 3; OUT 2
07E4 3FE7;                0785        BN4 LAB
07E6 7A;                  0786        REQ
07E7 02;                  0787 LAB: LDN R2
07E8 C20005;              0788        LBZ HOME
07EB E061FF;              0789        SEX R0; OUT 1 ,#FF
07EE 8CCE2CC4;            0790        GLO RC LSZ; DEC RC; NOP
07F2 C005BC;              0791 TYAGN1: LBR TRYAGN
07F5 ;                    0792
07F5 ;                    0793 END1: ORG *
07F5 ;                    0794 END
0000
```

Having thus described the invention, I claim:

1. In a fuel conserving control apparatus for a multiple unit locomotive consist having air brakes for slowing the consist when applied and a plurality of locomotives controlled by the apparatus in a manner to maintain at least one locomotive at a minimal output power level while at least one other locomotive operates at a higher power level to provide motive power for propelling the consist at the desired speed, the improvement comprising:

means for sensing application of the air brakes; and
means for reducing to the minimal power level locomotives which are operating at a power level higher than the minimal power level at the time of application of the air brakes.

2. The improvement of claim 1, wherein said reducing means reduces locomotives to the minimal power level sequentially with a time delay between the power reduction of successive locomotives.

3. The improvement of claim 2, including power reduction means for selectively decreasing the length of the time delay between the power reduction of successive locomotives.

4. The improvement of claim 1, including means for effecting a predetermined time delay between application of the air brakes and initiation of the reduction of the power level of the locomotives.

5. The improvement of claim 4, wherein said reducing means reduces locomotives to the minimal power level sequentially beginning at the end of said time delay and with a time gap between the power reduction of successive locomotives.

6. In a fuel conserving control apparatus for a multiple unit locomotive consist having air brakes for slowing the consist when applied and a plurality of locomotives with throttle circuits adjusted by the apparatus to different conditions for achieving the desired output power level in a fuel efficient manner, the improvement comprising:
  means for sensing application of the air brakes; and
  means for adjusting the throttle circuits in a manner to reduce to a minimal power level locomotives which are operating at a power level higher than the minimal level at the time of application of the air brakes.

7. The improvement of claim 6, including means for effecting a predetermined time delay between application of the air brakes and initiation of the reduction of the power level of the locomotives, said adjusting means reducing the power level of the locomotives at the end of said time delay if the application of the air brakes continues throughout the period of the time delay.

8. Fuel conserving control apparatus for a multiple unit locomotive consist headed by a lead locomotive and having air brakes for slowing the consist when applied and a plurality of trail locomotives having throttle circuits normally controlled by the setting of the lead locomotive throttle to normally maintain the locomotives at the same power output level, said apparatus comprising:
  means for setting a selected speed at which the consist is to travel;
  means for sensing the actual speed of travel of the consist;
  means for automatically adjusting the throttle circuits of the trail locomotives to incrementally increase or incrementally decrease the power output levels of the trail locomotives in sequence until the actual speed of the consist substantially conforms with the selected speed thereof;
  means for sensing application of the air brakes; and
  means responsive to the application of the air brakes for overriding said adjusting means in a manner to adjust the throttle circuits of the trail locomotives to effect a minimal output power condition of each trail locomotive operating at a power level higher than the minimal level at the time of application of the air brakes.

9. Apparatus as set forth in claim 8, including means for effecting a predetermmined time delay between application of the air brakes and initiation of the reduction of the power level of the locomotives.

10. Apparatus as set forth in claim 9, wherein said means for overriding reduces the locomotives to the minimal output power condition sequentially beginning at the end of said time delay and with a time gap between the power reduction of successive locomotives.

11. Apparatus as set forth in claim 10, including power reduction means for selectively decreasing the length of the time gap between the power reduction of successive locomotives.

12. Apparatus as set forth in claim 8, including means for establishing a predetermined range of speeds within which the consist is to operate and means for confining the setting of the selected speed to said predetermined range.

13. In a fuel conserving control apparatus for a multiple unit locomotive consist having a lead locomotive, a plurality of trail locomotives, and throttle circuits for the locomotives all normally having the same condition as the throttle circuit of the lead locomotive to operate all locomotives at substantially the same power level in a manual mode of operation, the improvement comprising:
  means for setting a set speed at which it is desired for the consist to operate;
  means for sensing the actual speed of the consist;
  means for operating the consist in a fuel save mode of operation in which the throttle circuits of the trail locomotives are adjusted automatically to sequentially increase or decrease the power levels of the locomotives in discrete increments to effect substantial conformity of the actual speed with the set speed;
  means for establishing minimum and maximum speeds of the consist; and
  means for confining the set speed to the range between said minimum and maximum speeds.

14. The improvement of claim 13, wherein said establising means includes adjustable switch means for selectively effecting a charge in the minimum and maximum speeds, said switch means being inaccessible to unauthorized personnel.

15. The improvement of claim 13, including means for disabling the fuel save mode of operation and effecting the manual mode of operation of the consist when the actual speed of the consist falls below said minimum speed.

16. The improvement of claim 13, wherein the consist has a dynamic brake for slowing the consist when applied, and including:
  means for sensing application of the dynamic brake for a preselected time period; and
  means for disabling the fuel save mode of operation and effecting the manual mode of operation for a predetermined override period following release of the dynamic brake when the dynamic brake has been applied for said preselected time period.

17. The improvement of claim 16, wherein the consist has air brakes for slowing the consist when applied, and including:
  means for detecting application of the air brakes;
  means for effecting a predetermined time delay following application of the air brakes; and
  means operable after elapse of said time delay to adjust the throttle circuits of the trail locomotives in a manner to reduce the trail locomotives to minimal power levels.

18. In a fuel conserving control apparatus for a multiple unit locomotive consist having lead and trail locomotives, a dynamic brake for slowing the consist when applied, throttle control circuits for the locomotives all normally having the same condition as the throttle circuit of the lead locomotive to operate all locomotives at substantially the same power level in a manual mode of operation, and fuel saver means for automatically controlling the throttle circuits in a manner to substantially achieve a desired speed of travel of the consist with the throttle circuits of the locomotives in fuel efficient conditions thereof in a fuel save mode of operation, the improvement comprising:
- means for sensing application of the dynamic brake;
- means for sensing elapse of a preselected time following application of the dynamic brake; and
- means for disabling the fuel save mode of operation and effecting the manual mode of operation for a predetermined override period following release of the dynamic brake if the dynamic brake is applied throughout said preselected time.

19. The improvement of claim 18, including:
- switch means for selecting the number of locomotives available to receive dynamic brake loading; and
- means for preventing dynamic brake loading of more then the selected number of locomotives.

20. The improvement of claim 19, including:
- a dynamic brake circuit for each locomotive for applying dynamic brake loading thereto;
- means for sensing the presence of a malfunction in each dynamic brake circuit; and
- means for preventing locomotives having a dynamic brake circuit malfunction from being selected among the number available to receive dynamic brake loading.

21. In a fuel conserving control apparatus for applying power reduction signals to a diesel electric locomotive engine having a plurality of governor solenoids energized and deenergized in predetermined patterns to effect a plurality of different throttle conditions including a minimal power condition in which all solenoids are deenergized, the combination of:
- a circuit for each solenoid leading thereto and receiving control signals for energizing the solenoid in a normal operating mode of the locomotive engine;
- transistor means for each circuit maintaining same in a completed state in the normal operating mode when a control signal is applied to the circuitry, thereby energizing each solenoid having a control signal applied to its circuit in the normal operating mode; and
- means for selectively applying a power reduction signal to said transistor means in a fuel save operating mode of the locomotive engine, said power reduction signal overriding the control signals and influencing said transistor means in a manner to effect interruption of each circuit to deenergize all solenoids, thereby effecting the minimal power throttle condition in response to application of the power reduction signal.

22. The combination of claim 21, wherein the locomotive engine has a half power throttle condition in which the governor solenoids are energized and deenergized in a selected pattern, and including means for selectively applying a second power reduction signal to said transistor means in the fuel save operating mode, said second power reduction signal influencing said transistor means in a manner to effect interruption and completion of the circuits in a combination to effect said selected pattern of energization and deenergization of the solenoids.

23. The combination of claim 21, including:
- a verification circuit for providing a verification signal when all solenoids are deenergized in response to application of the power reduction signal;
- second transistor means associated with said verification circuit, said second transistor means having a first condition when all solenoids are deenergized in response to application of the power reduction signal and a second condition when at least one solenoid is energized following application of the power reduction signal; and
- means for applying the verification signal to said verification circuit in the first condition of said second transistor means and for cancelling the verification signal in the second condition of said second transistor means.

24. A method of operating a multiple unit locomotive consist having a plurality of locomotives normally operative at the same power level and air brakes for slowing the consist when applied, said method comprising the steps of:
- selecting a set speed at which it is desired to operate the consist;
- sensing the actual speed of the consist;
- adjusting the power levels of the individual locomotives sequentially in discrete increments in a manner to achieve substantial conformity between the actual speed and the set speed with the consist operating in a fuel efficient manner;
- sensing application of the air brakes;
- delaying for a preselected time period following application of the air brakes; and
- then dropping the locomotives sequentially to a minimal power level when the air brakes have been applied for said preselected time period.

* * * * *